(12) United States Patent
Miranda Gavillan et al.

(10) Patent No.: US 10,303,376 B2
(45) Date of Patent: May 28, 2019

(54) DATA STORAGE LIBRARY WITH PASS-THROUGH CONNECTED MEDIA ACCLIMATION CHAMBER

(71) Applicant: International Business Machines Corporation, Armonk, NY (US)

(72) Inventors: Jose G. Miranda Gavillan, Tucson, AZ (US); Brian G. Goodman, Tucson, AZ (US); Kenny Nian Gan Qiu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 15/460,357

(22) Filed: Mar. 16, 2017

(65) Prior Publication Data
US 2018/0267716 A1 Sep. 20, 2018

(51) Int. Cl.
*G11B 15/68* (2006.01)
*G06F 3/06* (2006.01)

(52) U.S. Cl.
CPC .......... *G06F 3/0613* (2013.01); *G06F 3/0631* (2013.01); *G06F 3/0686* (2013.01); *G11B 15/682* (2013.01); *G11B 15/689* (2013.01)

(58) Field of Classification Search
CPC ............................ G11B 15/682; G11B 15/689
USPC ........................................................ 360/92.1
See application file for complete search history.

(56) References Cited

U.S. PATENT DOCUMENTS

| 4,831,476 A | 5/1989 | Branc et al. |
| 4,838,911 A | 6/1989 | Robertson et al. |
| 5,278,708 A | 1/1994 | Apple et al. |
| 5,449,229 A | 9/1995 | Aschenbrenner et al. |
| 5,940,354 A | 8/1999 | Inoue |

(Continued)

FOREIGN PATENT DOCUMENTS

| CN | 102192631 A | 9/2011 |
| CN | 102407663 A | 4/2012 |

(Continued)

OTHER PUBLICATIONS

List of IBM Patents or Applications Treated as Related.
(Continued)

*Primary Examiner* — Jefferson A Evans
(74) *Attorney, Agent, or Firm* — Fox Rothschild LLP

(57) ABSTRACT

A data storage library system includes a first data storage library and a second data storage library, and at least one pass-through mechanism coupling the first data storage library to the second data storage library, wherein the at least one pass-through mechanism is configured to enable data storage cartridges to be transported between the first data storage library and the second data storage library. The environmental conditions within the first data storage library are controllable to maintain operational conditions conducive to at least one of reading and writing of data on a plurality of data storage cartridges. The environmental conditions within the second data storage library are controllable so as to gradually transition the environmental conditions between ambient environmental conditions and operational conditions within the first data storage library. Associated methods for transporting components between the first and second data storage libraries are disclosed.

15 Claims, 14 Drawing Sheets

(56) References Cited

U.S. PATENT DOCUMENTS

| | | |
|---|---|---|
| 6,347,020 B1 | 2/2002 | Carpenter et al. |
| 6,366,982 B1 | 4/2002 | Suzuki et al. |
| 6,409,450 B1 | 6/2002 | Ostwald et al. |
| 6,457,928 B1* | 10/2002 | Ryan .................. G11B 15/6825 312/9.1 |
| 6,467,285 B2 | 10/2002 | Felder et al. |
| 6,478,524 B1 | 11/2002 | Malin |
| 6,494,663 B2* | 12/2002 | Ostwald ............. G11B 15/6805 360/92.1 |
| 6,537,013 B2 | 3/2003 | Emberty et al. |
| 6,563,771 B1 | 5/2003 | Debiez |
| 6,661,596 B2 | 12/2003 | Chliwnyj et al. |
| 6,676,026 B1 | 1/2004 | McKinley et al. |
| 6,676,505 B2 | 1/2004 | Behl |
| 6,854,275 B2 | 2/2005 | Evans |
| 6,896,612 B1 | 5/2005 | Novotny |
| 6,924,981 B2 | 8/2005 | Chu et al. |
| 6,940,716 B1 | 9/2005 | Korinsky et al. |
| 7,039,924 B2 | 5/2006 | Goodman et al. |
| 7,106,538 B2 | 9/2006 | Minemura et al. |
| 7,277,247 B2 | 10/2007 | Hoshino |
| 7,434,412 B1 | 10/2008 | Miyahira |
| 7,474,497 B2 | 1/2009 | Jesionowski et al. |
| 7,635,246 B2 | 12/2009 | Neeper et al. |
| 7,656,602 B2 | 2/2010 | Iben et al. |
| 7,656,660 B2 | 2/2010 | Hoeft et al. |
| 7,746,634 B2 | 6/2010 | Hom et al. |
| 7,751,188 B1 | 7/2010 | French et al. |
| 7,961,419 B2 | 6/2011 | Suzuki et al. |
| 8,051,671 B2 | 11/2011 | Vinson et al. |
| 8,141,621 B2 | 3/2012 | Campbell et al. |
| 8,151,046 B2 | 4/2012 | Suzuki et al. |
| 8,206,976 B2 | 6/2012 | Kobayashi et al. |
| 8,210,914 B2 | 7/2012 | McMahan et al. |
| 8,514,513 B2 | 8/2013 | Hori |
| 8,544,289 B2 | 10/2013 | Johnson et al. |
| 8,675,303 B2 | 3/2014 | Compton et al. |
| 8,694,152 B2 | 4/2014 | Cyrulik et al. |
| 8,789,384 B2 | 7/2014 | Eckberg et al. |
| 8,849,784 B2 | 9/2014 | Alber et al. |
| 8,857,208 B2 | 10/2014 | Malin |
| 8,939,524 B2 | 1/2015 | Gasser |
| 8,974,274 B2 | 3/2015 | Carlson |
| 9,025,275 B1 | 5/2015 | Manes et al. |
| 9,069,534 B2 | 6/2015 | Rogers |
| 9,110,641 B2 | 8/2015 | Wu |
| 9,155,230 B2 | 10/2015 | Eriksen |
| 9,190,112 B1 | 11/2015 | Bayang et al. |
| 9,240,209 B1 | 1/2016 | Crawford et al. |
| 9,255,936 B2 | 2/2016 | Hunt et al. |
| 9,291,408 B2 | 3/2016 | Iyengar et al. |
| 9,321,136 B2 | 4/2016 | Eckberg et al. |
| 9,361,921 B2 | 6/2016 | Herget |
| 9,368,148 B2 | 6/2016 | Starr et al. |
| 9,433,122 B2 | 8/2016 | Ohba et al. |
| 9,642,286 B1 | 5/2017 | Gutierrez et al. |
| 9,888,615 B1 | 2/2018 | Frink et al. |
| 9,916,869 B1 | 3/2018 | Miranda Gavillan et al. |
| 9,916,871 B1* | 3/2018 | Miranda Gavillan ........................ G11B 33/144 |
| 9,940,976 B1* | 4/2018 | Gale ................ G11B 33/144 |
| 10,004,165 B1* | 6/2018 | Bailey ................ H05K 7/20818 |
| 10,026,455 B1* | 7/2018 | Miranda Gavillan ........................ G11B 33/144 |
| 10,045,457 B1* | 8/2018 | Miranda Gavillan ........................ H05K 7/1488 |
| 2002/0023444 A1 | 2/2002 | Felder et al. |
| 2002/0098064 A1 | 7/2002 | Ostwald et al. |
| 2003/0039056 A1 | 2/2003 | Satoh |
| 2003/0197619 A1 | 10/2003 | Lawrence et al. |
| 2004/0025515 A1 | 2/2004 | Evans |
| 2004/0080244 A1 | 4/2004 | Lowther et al. |
| 2004/0145468 A1 | 7/2004 | La et al. |
| 2004/0153386 A1 | 8/2004 | Eckerdt |
| 2004/0165358 A1 | 8/2004 | Regimbal et al. |
| 2004/0264042 A1* | 12/2004 | Pollard .............. G11B 15/6835 360/92.1 |
| 2005/0057847 A1* | 3/2005 | Armagost .......... G11B 15/6835 360/92.1 |
| 2005/0170770 A1 | 8/2005 | Johnson et al. |
| 2005/0185323 A1 | 8/2005 | Brace et al. |
| 2005/0270727 A1 | 12/2005 | Shih |
| 2006/0177922 A1 | 8/2006 | Shamah et al. |
| 2006/0250578 A1 | 11/2006 | Pohl et al. |
| 2006/0259195 A1 | 11/2006 | Eliuk et al. |
| 2007/0180278 A1 | 8/2007 | Botchek |
| 2007/0250410 A1 | 10/2007 | Brignone et al. |
| 2008/0094797 A1 | 4/2008 | Coglitore et al. |
| 2008/0106368 A1 | 5/2008 | Vitier |
| 2008/0151491 A1 | 6/2008 | Baldwin et al. |
| 2008/0231152 A1 | 9/2008 | Malin |
| 2009/0046427 A1 | 2/2009 | Noteboom et al. |
| 2009/0061758 A1 | 3/2009 | Yeung et al. |
| 2009/0266511 A1 | 10/2009 | Yang |
| 2010/0078492 A1 | 4/2010 | Cislo |
| 2010/0170277 A1 | 7/2010 | Schmitt et al. |
| 2010/0188810 A1 | 7/2010 | Andersen et al. |
| 2010/0254241 A1 | 10/2010 | Aoki |
| 2011/0022771 A1 | 1/2011 | Foerster |
| 2011/0108207 A1 | 5/2011 | Mainers et al. |
| 2011/0231007 A1 | 9/2011 | Biehle et al. |
| 2012/0046792 A1 | 2/2012 | Secor |
| 2012/0155027 A1 | 6/2012 | Broome et al. |
| 2012/0305042 A1 | 12/2012 | Lorbiecki |
| 2013/0031928 A1 | 2/2013 | Kim |
| 2013/0088833 A1 | 4/2013 | Cox et al. |
| 2013/0128455 A1 | 5/2013 | Koblenz et al. |
| 2013/0244563 A1 | 9/2013 | Noteboom et al. |
| 2014/0019768 A1 | 1/2014 | Pineau et al. |
| 2014/0059946 A1 | 3/2014 | Gardner et al. |
| 2014/0206271 A1 | 7/2014 | Ignacio |
| 2014/0238639 A1 | 8/2014 | Ambriz et al. |
| 2014/0277765 A1 | 9/2014 | Karimi et al. |
| 2014/0290162 A1 | 10/2014 | Tanimoto |
| 2014/0293471 A1 | 10/2014 | Sakuma |
| 2015/0036293 A1 | 2/2015 | Martini |
| 2015/0086305 A1* | 3/2015 | Ostwald ............. G11B 15/6835 414/281 |
| 2015/0088319 A1 | 3/2015 | Dasari et al. |
| 2015/0167996 A1 | 6/2015 | Fadell et al. |
| 2015/0179210 A1 | 6/2015 | Ostwald et al. |
| 2015/0203297 A1 | 7/2015 | Manning et al. |
| 2015/0269641 A1 | 9/2015 | Roy |
| 2015/0294525 A1 | 10/2015 | Broom et al. |
| 2016/0094898 A1 | 3/2016 | Primm et al. |
| 2016/0107312 A1 | 4/2016 | Morrill et al. |
| 2016/0109389 A1 | 4/2016 | Suzuki et al. |
| 2016/0112245 A1 | 4/2016 | Mankovskii |
| 2016/0117126 A1 | 4/2016 | De Spiegeleer et al. |
| 2016/0240061 A1 | 8/2016 | Li et al. |
| 2016/0302332 A1 | 10/2016 | Anderson et al. |
| 2017/0010015 A1* | 1/2017 | Jan ......................... F24F 3/1411 |
| 2017/0064876 A1 | 3/2017 | Leckelt et al. |
| 2017/0154483 A1 | 6/2017 | Cordiner et al. |
| 2017/0275012 A1 | 9/2017 | Tretow et al. |
| 2017/0323666 A1* | 11/2017 | Jesionowski ........ G11B 33/144 |
| 2017/0347496 A1 | 11/2017 | Smith |
| 2018/0077819 A1 | 3/2018 | Roy |
| 2018/0155975 A1 | 6/2018 | Kempfle |
| 2018/0172304 A1 | 6/2018 | Wolfson |
| 2018/0267717 A1* | 9/2018 | Miranda Gavillan ........................ G06F 3/0613 |
| 2018/0268859 A1* | 9/2018 | Miranda Gavillan . G11B 15/68 |
| 2018/0268874 A1* | 9/2018 | Miranda Gavillan ........................ G11B 33/144 |

FOREIGN PATENT DOCUMENTS

| | | |
|---|---|---|
| CN | 102881313 A | 1/2013 |
| CN | 102881313 A | 1/2013 |
| CN | 204361533 U | 5/2015 |
| JP | 11-287499 | 10/1999 |

(56) References Cited

FOREIGN PATENT DOCUMENTS

| JP | 2001307474 A | 11/2001 |
|---|---|---|
| JP | 2009087518 A | 4/2009 |
| JP | 2011191207 A | 9/2011 |
| WO | 2007099542 A2 | 9/2007 |
| WO | 2008014578 A1 | 2/2008 |
| WO | 2009134610 A2 | 11/2009 |
| WO | 2010067443 A1 | 6/2010 |

OTHER PUBLICATIONS

Hanaoka Y. et al., "Technologies for Realizing New ETERNUS LT270 High-End tape Library System", FUJITSU Sci. Tech. J., 42.1, pp. 24-31, Jan. 2006.

McCormick-Goodhart M. et al, "The Design and Operation of a Passive Humidity-Controlled Cold Storage Vault Using conventional Freezer Technology and Moisture-Sealed Cabinets", IS&T's 2004 Archiving Conference, Apr. 20-23, 2005, San Antonio, Texas.

Frachtenberg E. et al., "Thermal Design in the Open Compute Datacenter", Thermal and Thermomechanical Phenomena in Electronic Systems (ITherm), 13th IEEE I22012.

Oga, S. et al., "Indirect External Air Cooling Type Energy-Saving Hybrid Air Conditioner for Data Centers, "F-COOL NEO"", Fuji Electric Review, vol. 60, No. 1, Mar. 30, 2014, pp. 59-64.

Lee, S. et al., "Thermoelectric-based Sustainable Self-Cooling for Fine-Grained Processor Hot Spots", 15th IEEE ITHERM Conference, May 31-Jun. 3, 2016, pp. 847-856.

Disclosed Anonymously, ip.com, "Method for a Direct Air Free Cooling with a real time hygrometry regulation for Data Center", IPCOM000200312D, Oct. 5, 2010, pp. 1-3.

Rasmussen N., "Cooling Options for Rack Equipment with Side-to-Side Airflow", www.apc.com, 2004.

Ouchi M. et al., "Thermal Management Systems for Data Centers with Liquid Cooling Technique of CPU", ITherm IEEE 13th Intersociety Conference, May 30-Jun. 1, 2012, pp. 790-798.

Authors: IBM, "Energy Efficient Cooling System for Data Center", IPCOM000182040D, Apr. 23, 2009, pp. 1-4.

Ernest S. Gale et al., U.S. Appl. No. 15/460,389, filed Mar. 16, 2017.
Ernest S. Gale et al., U.S. Appl. No. 15/460,397, filed Mar. 16, 2017.
Ernest S. Gale et al., U.S. Appl. No. 15/460,403, filed Mar. 16, 2017.
Ernest S. Gale et al., U.S. Appl. No. 15/460,420, filed Mar. 16, 2017.
Jose G. Miranda Gavillan et al., U.S. Appl. No. 15/460,345, filed Mar. 16, 2017.
Jose G. Miranda Gavillan et al., U.S. Appl. No. 15/460,357, filed Mar. 16, 2017.
Jose G. Miranda Gavillan et al., U.S. Appl. No. 15/460,379, filed Mar. 16, 2017.
Jose G. Miranda Gavillan et al., U.S. Appl. No. 15/460,402, filed Mar. 16, 2017.
Jose G. Miranda Gavillan et al., U.S. Appl. No. 15/460,423, filed Mar. 16, 2017.
Jose G. Miranda Gavillan et al., U.S. Appl. No. 15/460,441, filed Mar. 16, 2017.
Jose G. Miranda Gavillan et al., U.S. Appl. No. 15/460,456, filed Mar. 16, 2017.
Jose G. Miranda Gavillan et al., U.S. Appl. No. 15/460,472, filed Mar. 16, 2017.
Jose G. Miranda Gavillan et al., U.S. Appl. No. 15/460,479, filed Mar. 16, 2017.
Jose G. Miranda Gavillan et al., U.S. Appl. No. 15/460,429, filed Mar. 16, 2017.
Jose G. Miranda Gavillan et al., U.S. Appl. No. 15/460,439, filed Mar. 16, 2017.
Ernest S. Gale et al., U.S. Appl. No. 15/460,497, filed Mar. 16, 2017.

* cited by examiner

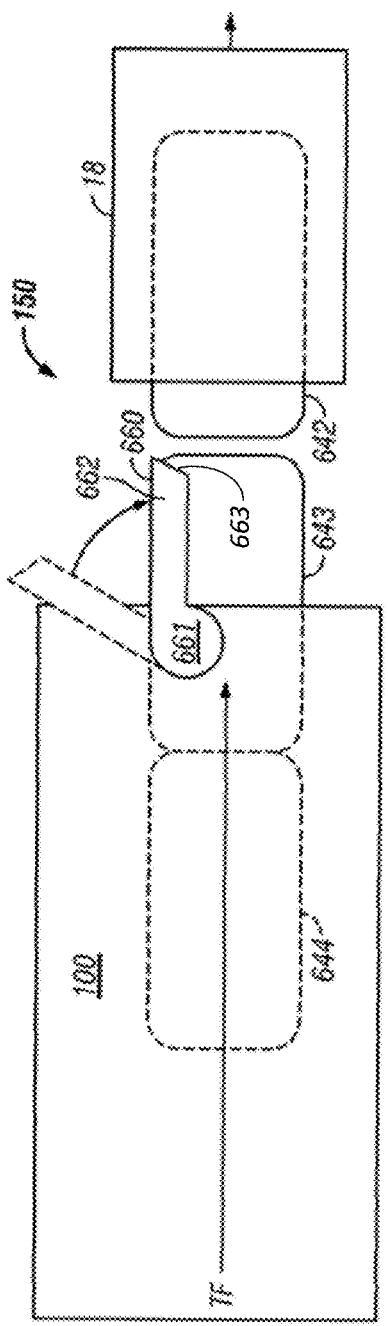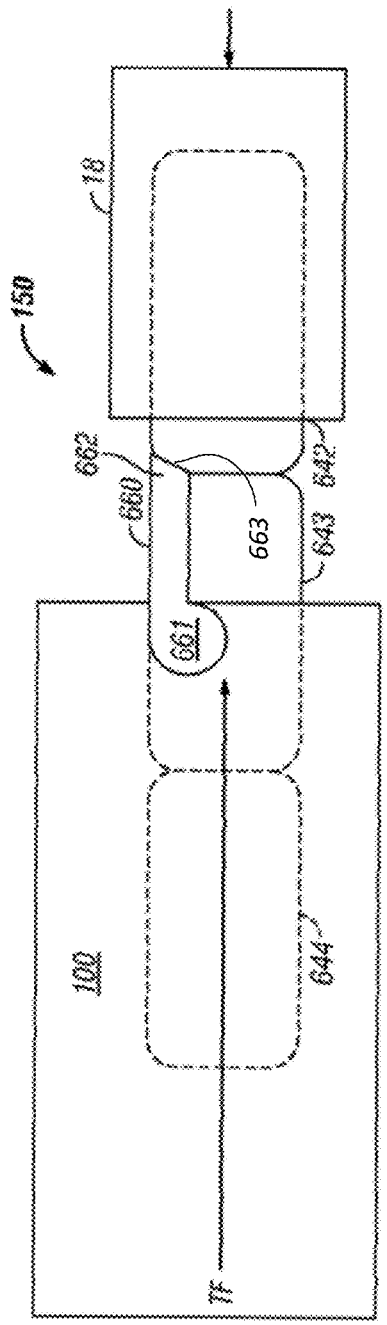

DATA STORAGE LIBRARY WITH PASS-THROUGH CONNECTED MEDIA ACCLIMATION CHAMBER

BACKGROUND

The present invention relates to a data storage library for the storage and transfer of data, and more specifically, to a data storage library having one or more library frames coupled via a pass-through mechanism to form a media acclimation chamber of the data storage library.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or disks), electronic media (such as PROM, EEPROM, flash PROM, COMPACTFLASH™, SMARTMEDIA™, MEMORY STICK™, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more robotic accessors. Such accessors have grippers for physically retrieving the selected data storage cartridges from the storage slots within the automated data storage library and transporting such cartridges to the data storage drives by moving, for example, in the horizontal (X) and vertical (Y) directions.

In an effort to increase storage capacity, deep slot technology allows for storage cells that contain more than a single data storage cartridge. Such storage libraries allow for higher density, or more cartridges stored per square foot. In "deep slot" libraries, two or more cartridges may be stored in a multi-cartridge deep slot cell, arrayed in series, one behind the other, in tiers ranging from a front-most tier to a rearmost tier.

SUMMARY

In accordance with an aspect of the present disclosure, a data storage library is disclosed. The system includes a first data storage library and a second data storage library, wherein the first data storage library has a first environmental conditioning unit configured to control at least one environmental condition within the first data storage library. The system also includes at least one pass-through mechanism coupling the first data storage library to the second data storage library, wherein the at least one pass-through mechanism is configured to enable data storage cartridges to be transported between the first data storage library and the second data storage library, wherein the environmental conditions within the first data storage library are controllable to maintain operational conditions conducive to at least one of reading and writing of data on a plurality of data storage cartridges. Furthermore, the environmental conditions within the second data storage library are controllable so as to gradually transition the environmental conditions within the second data storage library between ambient environmental conditions outside of the first data storage library and operational conditions within the first data storage library.

In accordance with another aspect of the present disclosure, a system is disclosed which includes a first data storage library comprising a first environmental condition unit configured to control at least one desired environmental condition within the first data storage library, and a second data storage library comprising at least one corresponding environmental condition. The system also includes at least one pass-through mechanism coupling the first data storage library and the second data storage library, wherein the at least one corresponding environmental condition within the second data storage library is controllable to change between ambient environmental conditions outside of the second data storage library and the at least one desired environmental condition within the first data storage library. In one aspect of the disclosure, the second data storage library may be a dedicated acclimation library.

According to another aspect of the present disclosure, a method of acclimating one or more data storage cartridges within a data storage library is disclosed. The method includes providing a data storage library system having at least one primary data storage library and at least one acclimation library, wherein the at least one acclimation library is coupled to the at least one primary data storage library with a pass-through mechanism, providing at least one data storage cartridge, and adjusting at least one environmental condition within the at least one acclimation library to within a desired range of the at least one ambient environmental condition outside of the acclimation library. The method also includes inserting the at least one data storage cartridge into the at least one acclimation library, and adjusting at least one environmental condition within the at least one acclimation library based upon monitored environmental conditions within the at least one acclimation library and environmental conditions within the at least one primary data storage library. Furthermore, the method includes transporting the at least one data storage cartridge from the at least one acclimation library to the at least one primary data storage library via the pass-through mechanism when the at least one environmental condition within the at least one acclimation library is within a desired range of the corresponding environmental condition within the primary data storage library.

BRIEF DESCRIPTION OF THE DRAWINGS

FIGS. 8A-8D are partial side views of one embodiment of a cartridge blocking mechanism.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a" "an" and "the" include plural referents unless otherwise specified.

Efforts to improve the performance of traditional data centers attempt to minimize the cost of processing and storing data. One option that is employed to reduce operational costs of datacenters is to run the equipment in the datacenter at the high end of its environmental operational limits, thereby allowing for cooling of the datacenter to be reduced. In other words, datacenters are running increasingly hot and more humid conditions than traditional datacenters in an attempt to reduce operating costs. Although this strategy may be effective when applied to disk and/or flash data storage environments, magnetic tape is more susceptible to degradation when exposed to these unfavorable conditions. Therefore, this option is not available for magnetic data storage libraries.

In an effort to control the environment within magnetic data storage libraries so as to provide suitable working conditions for magnetic tape media, data storage drives, etc., air conditioning units may be incorporated into the data storage libraries themselves. While these air conditioning units effectively control the temperature and humidity within the data storage libraries, the environmental conditions of the area surrounding the data storage libraries remain largely unchanged, with conditions often being higher in both temperature and humidity. While this may allow a datacenter to operate at reduced costs, it may also result in a marked temperature differential between the interior and exterior environments of the data storage libraries. Such a temperature differential may prove problematic during service of the data storage library and/or replacement of data storage library components such as data storage cartridges, data storage drives, etc., as condensation may develop on replacement cartridges and other service parts during installation and/or removal from the data storage library. Condensation accumulation on such sensitive componentry may cause component failure and/or data loss.

Figure 1A:
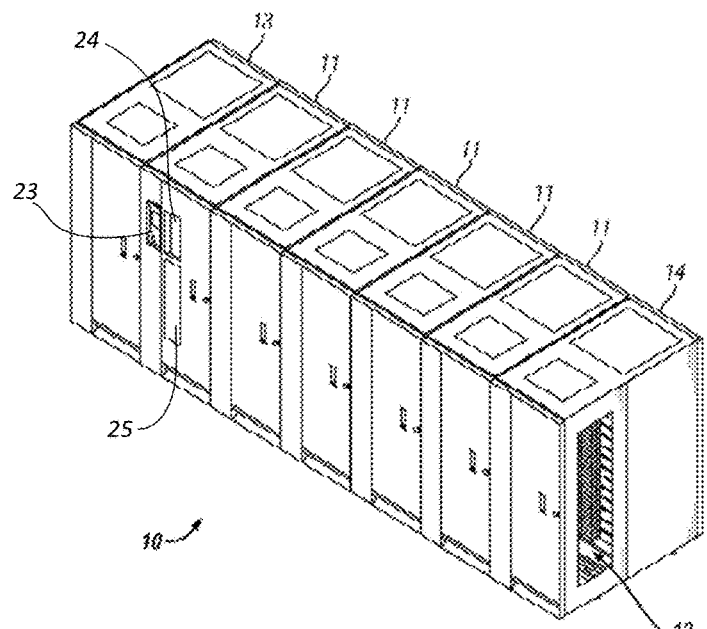
FIG. 1A is a perspective view of one embodiment of an automated data storage library.
Figure 1B:
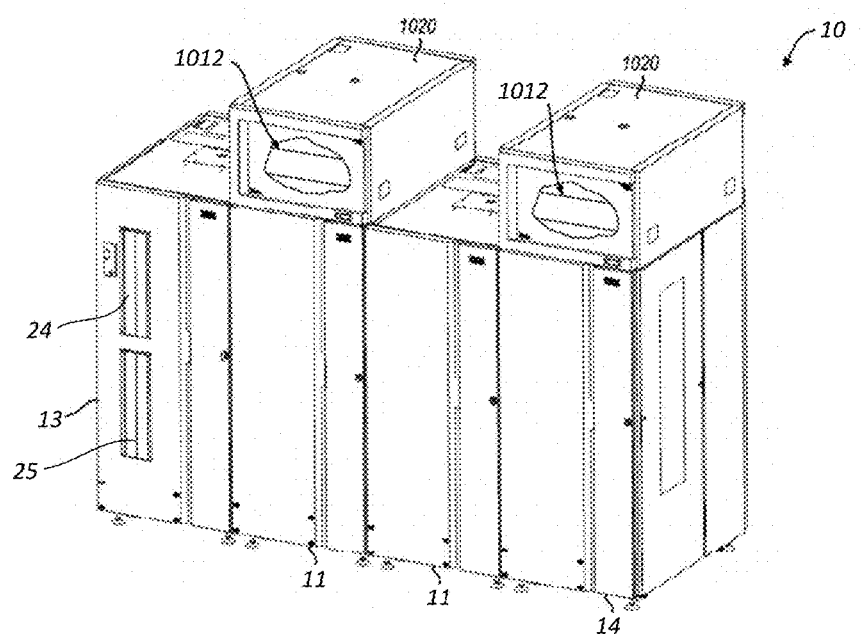
FIG. 1B is a perspective view of another embodiment of an automated data storage library.
Figure 2:
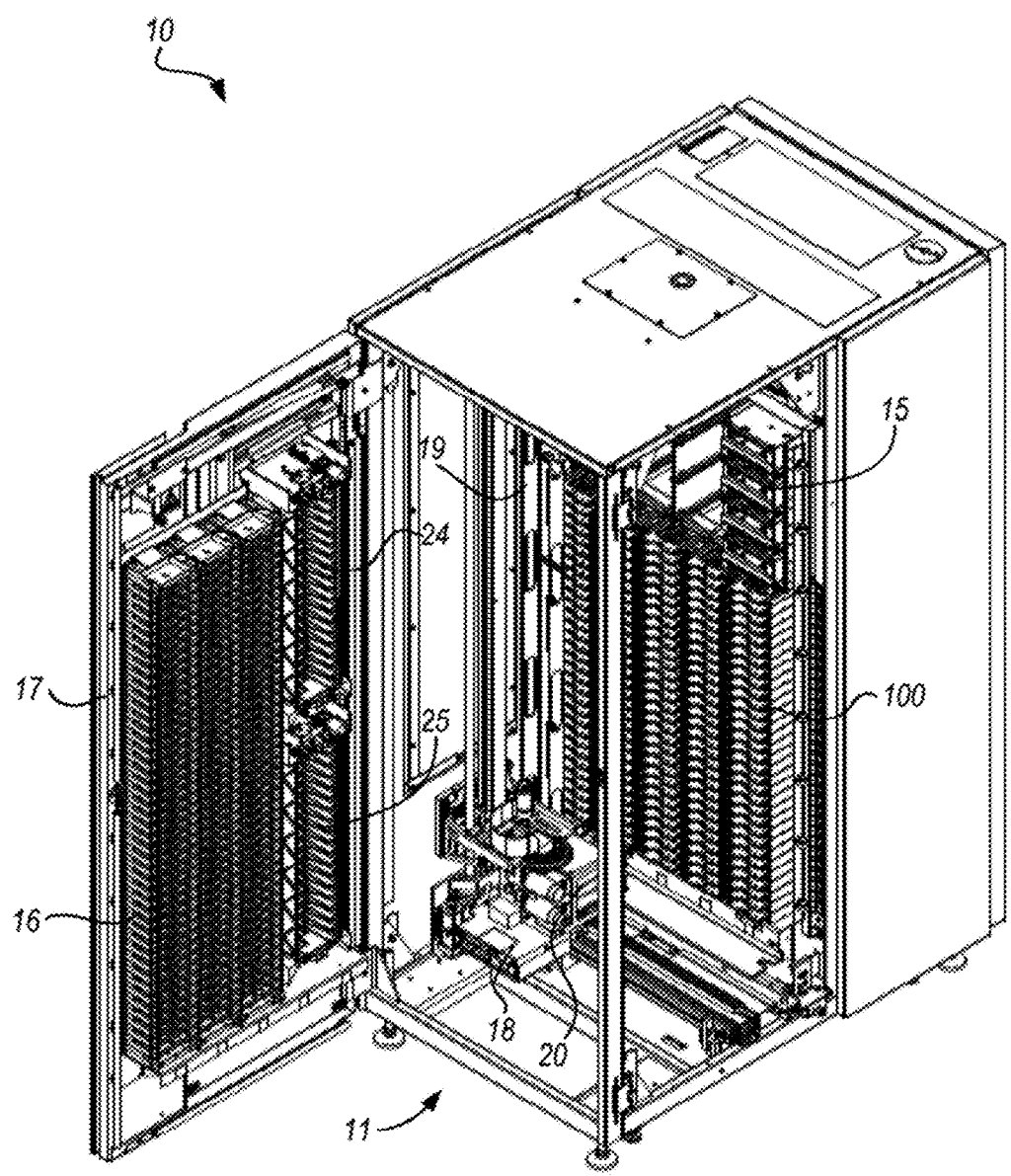
FIG. 2 is a perspective view of a storage frame from the data storage library of FIGS. 1A-1B.

FIG. 1A and FIG. 2 illustrate an automated data storage library 10 which stores and retrieves data storage cartridges, containing data storage media (not shown), from multi-cartridge deep slot storage cells 100 and single cartridge storage slots 16. An example of an automated data storage library which has a similar configuration as that depicted in FIGS. 1-2, and may be implemented with some of the various approaches herein is the IBM 3584 UltraScalable Data storage library. Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11, and right hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot storage cells, drives, import/export stations, accessors, operator panels, etc. Moreover, an accessor channel 12 preferably extends between the storage frames and bays of the present embodiment, thereby allowing an accessor to move between frames.

FIG. 2 shows an exemplary embodiment of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front door 17 and a plurality of multi-cartridge deep slot storage cells 100 on rear wall 19, both of which may be used for storing data storage cartridges that may contain data storage media. According to one approach, the storage slots 16 are configured to store a single data storage cartridge, and the multi-cartridge deep slot storage cells 100 are configured to store a plurality of data storage cartridges. In a preferred approach, the multi-cartridge deep slot storage cells may be arranged in sequential order of tiers from front to rear (e.g., see FIG. 7A).

With continued reference to FIG. 2, the storage frame 11 of the library 10 also includes at least one data storage drive 15, e.g., for reading and/or writing data with respect to the data storage media. Additionally, a first accessor 18 may be used to transport data storage media between the plurality of storage slots 16, the multi-cartridge deep slot storage cells, and/or the data storage drive(s) 15. According to various approaches, the data storage drives 15 may be optical disk drives, magnetic tape drives, or other types of data storage drives as are used to read and/or write data with respect to the data storage media.

As illustrated, the storage frame 11 may optionally include an operator panel or other user interface, such as a web-based interface, which allows a user to interact with the library 10. The storage frame 11 may also optionally comprise an upper import/export (I/O) station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage slots 16, preferably accessible by the first accessor 18.

As described above, the storage frames 11 may be configured with different components depending upon the intended function. One configuration of storage frame 11 may comprise storage slots 16 and/or multi-cartridge deep slot storage cells 100, data storage drive(s) 15, and other optional components to store and retrieve data from the data storage cartridges. However, in another approach, a storage frame 11 may include storage slots 16 and/or multi-cartridge deep slot storage cells 100 and no other components. The first accessor 18 may have a gripper assembly 20, e.g., for gripping one or more data storage media, in addition to having a bar code scanner or other reading system, such as a cartridge memory reader or similar system mounted on the gripper assembly 20, to "read" identifying information about the data storage media.

Figure 3:
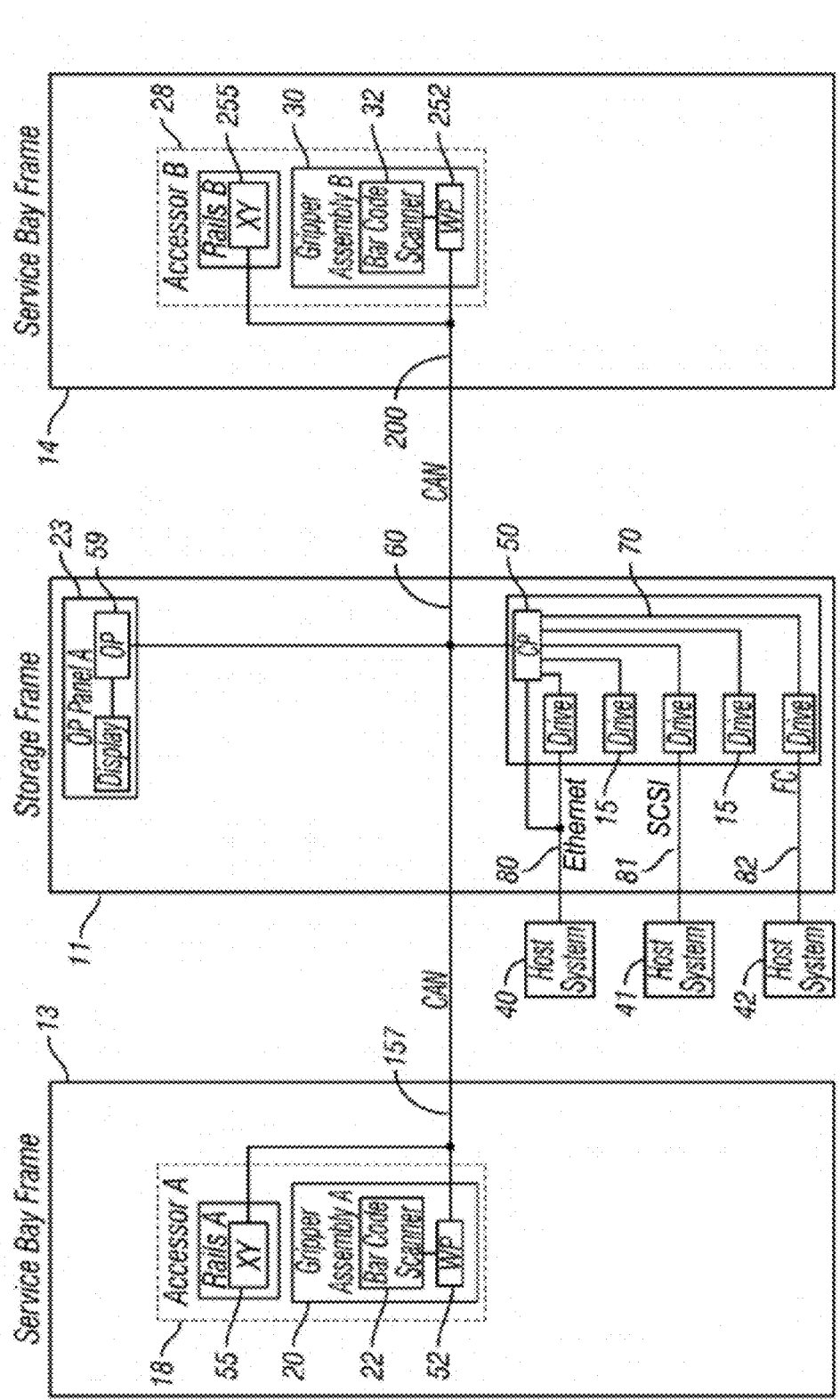
FIG. 3 is a block diagram of one embodiment of an automated data storage library.

FIG. 3 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other FIGS.) should be deemed to include any and all possible permutations Referring now to FIG. 3, the automated data storage library 10 as described in reference to FIGS. 1 and 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a bar code scanner (e.g., reading system) to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media.

According to one approach, in the event of a failure or other unavailability of the first accessor 18, or its gripper assembly 20, etc., the second accessor 28 may perform some or all of the functions of the first accessor 18. Thus in different approaches, the two accessors 18, 28 may share one or more mechanical paths, they may have completely independent mechanical paths, or combinations thereof. In one example, the accessors 18, 28 may have a common horizontal rail with independent vertical rails to travel therealong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc. the data storage cartridge at the storage slots 16, multi-cartridge deep slot storage cells 100, data storage drives 15, etc.

With continued reference to FIG. 3, library 10 receives commands from one or more host systems 40, 41, 42. The host systems 40, 41, 42, such as host servers, communicate with the library directly, e.g., on line 80 (e.g., path), through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16 and the data storage drives 15. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

Still referring to FIG. 3, the communication processor node 50 may additionally provide a line 70 for communicating with the data storage drives 15, e.g., a communication link. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA, the CAN in Automation Association, Am Weich Selgarten 26, D-191058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via lines 70, and are thereby communicating with the drives 15 and with host systems 40, 41, 42. Alternatively, the host systems 40, 41, 42 may be directly coupled to the communication processor node 50, at line 80 (e.g., input) for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, lines 80 and 81 are intended to be Ethernet and a SCSI bus, respectively, e.g., and may serve as host connections. However, path 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, data storage drives 15, networks 60, etc.

Moreover, as described above, the automated data storage library 10 may comprise a plurality of accessors. A second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover, the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
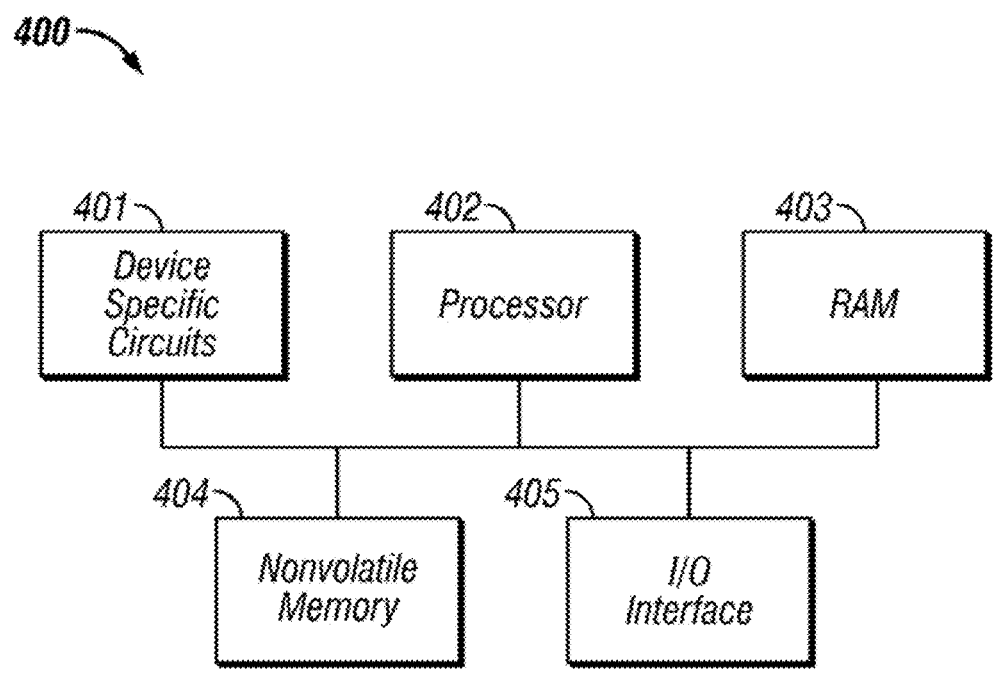
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, serial interfaces such as RS-232, USB (Universal Serial Bus) or Small Computer Systems Interface (SCSI). The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
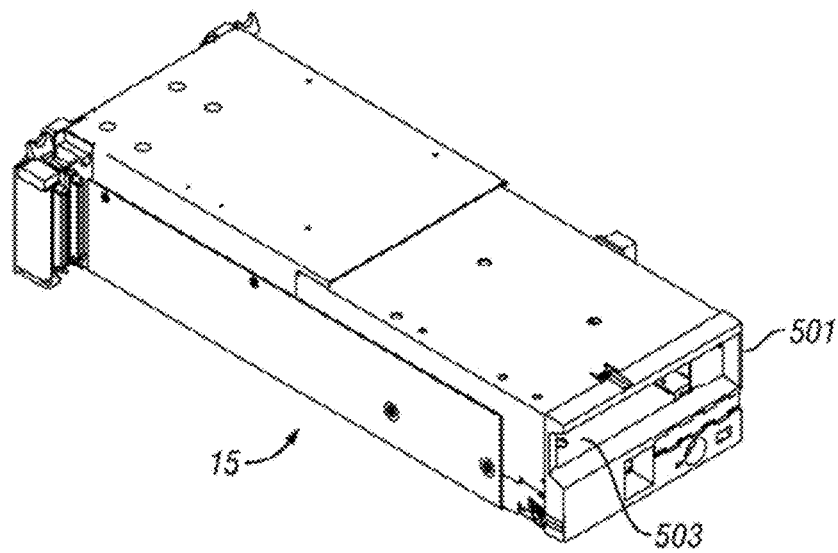
FIG. 5A is a front perspective view of one embodiment of a data storage drive.
Figure 5B:
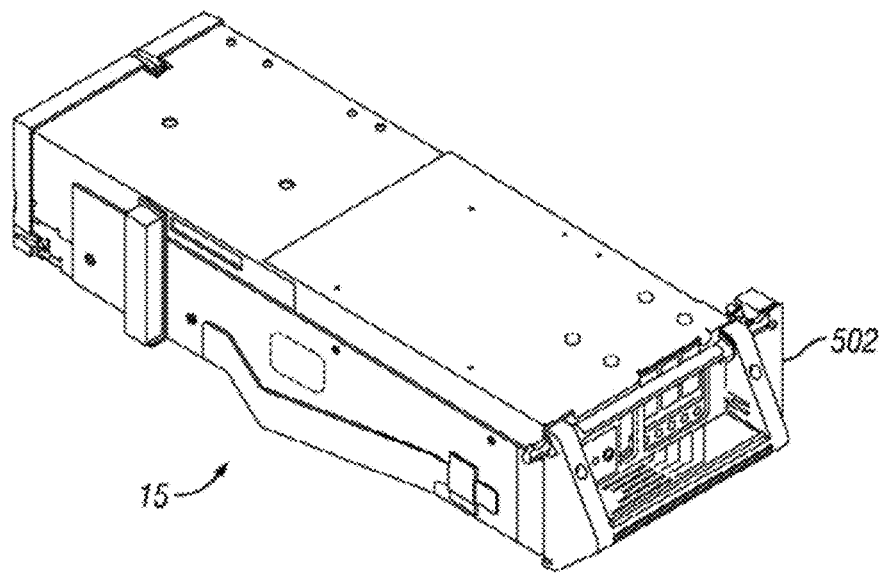
FIG. 5B is a rear perspective view of the data storage drive of FIG. 5A.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 503.

Figure 6:
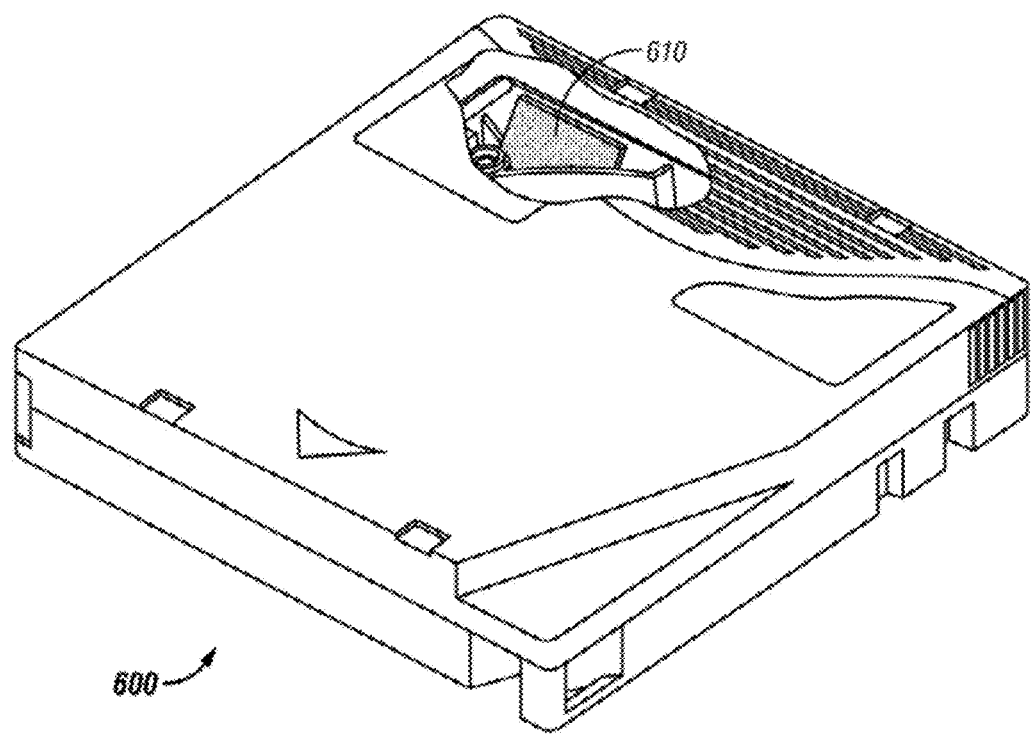
FIG. 6 is perspective view of one embodiment of a data storage cartridge having a cutaway portion.

Furthermore, FIG. 6 illustrates an embodiment of a data storage cartridge 600 with a cartridge memory 610 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, disks, etc.; electronic media, e.g., PROM, EEPROM, flash PROM, COMPACT-FLASH™, SMARTMEDIA™, MEMORY STICK™, etc.; etc., or other suitable media. Moreover, an example of a data storage cartridge that is widely employed in automated data storage libraries for mass data storage is a magnetic tape cartridge in which the media is magnetic tape.

Figure 7A:
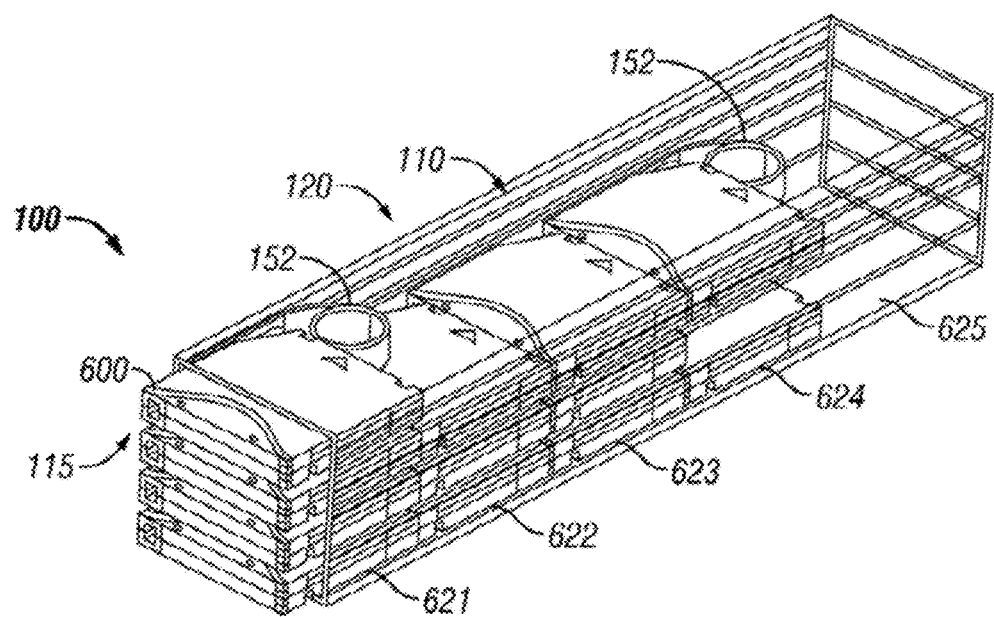
FIGS. 7A-7B are perspective views of one embodiment of a multi-cartridge deep slot cell.
Figure 7B:
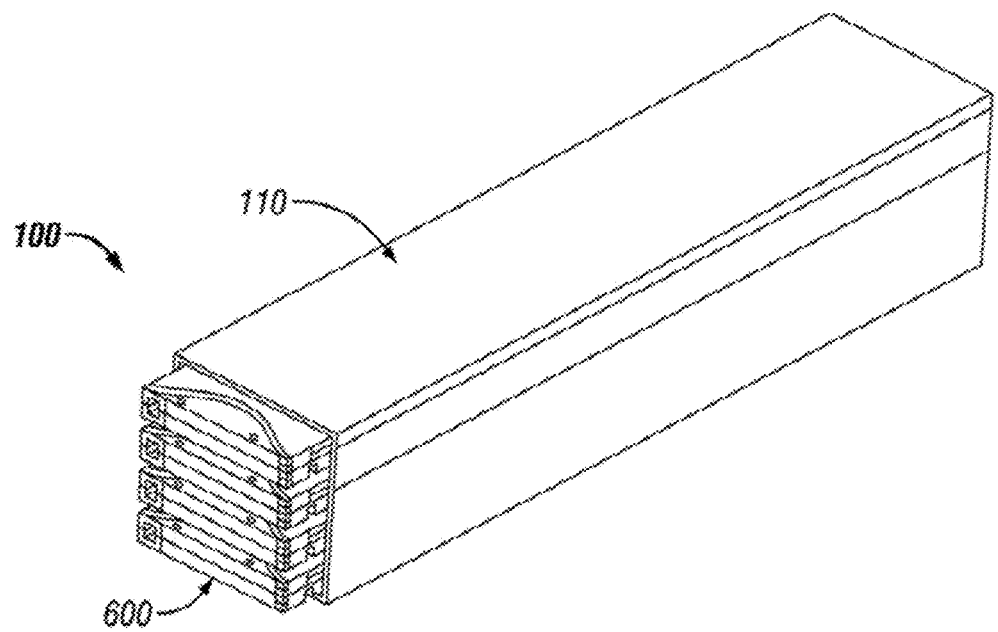

Looking now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. Furthermore, a plurality of storage slots 120 is disposed within the housing, and may be configured for storing up to a plurality of data storage cartridges 600, depending on the desired approach. Alternatively, the multi-cartridge deep slot cell 100 may be built into the frame of the automated data storage library according to one approach.

FIGS. 8A-8D illustrate an embodiment of a cartridge blocking mechanism 150 having a retaining gate 660 that retains the data storage cartridges in the multi-cartridge deep slot cell 100 according to one embodiment. As illustrated, according to one approach, the retaining gate 660 may be externally attached to a multi-cartridge deep slot cell 100, relative to a front opening of the multi-cartridge deep slot cell 100, whereby the retaining gate 660 can be activated by an accessor 18, e.g., of an automated data storage library. Moreover, the retaining gate 660 allows for positive cartridge retention against the pressure of biasing springs (see 152 of FIGS. 7A-7B), and ensures that one or more data storage cartridges do not get pushed out of the multi-cartridge deep slot cell 100 simultaneously, while allowing the pushing mechanism (not shown) of the multi-cartridge deep slot cell 100 to continuously push data storage cartridge(s) to the opening in a multi-cartridge deep slot cell 100. Thus, according to one approach, the accessor 18 may open the retaining gate to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

Figure 8A:
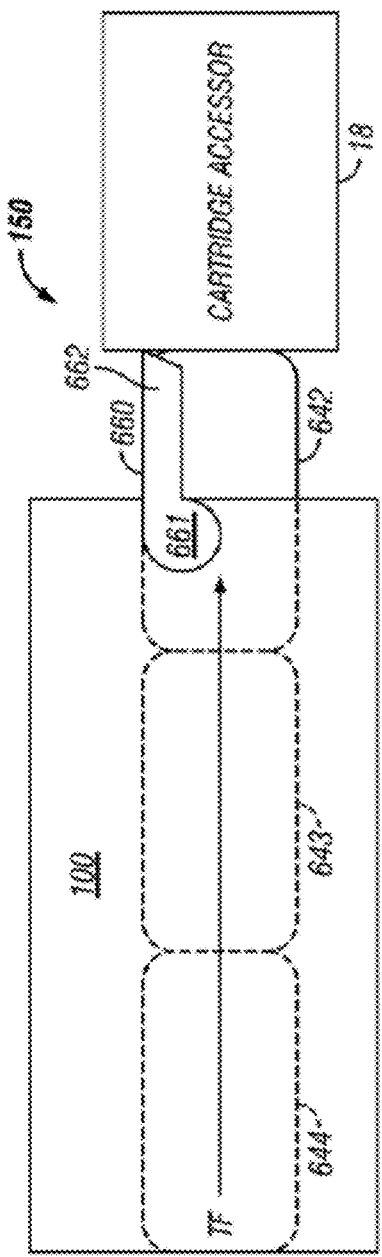

The basic working of the retaining gate is that the gate prevents the data storage cartridge(s) from being pushed out of a multi-cartridge deep slot cell 100. For example, as shown in FIGS. 8A-8D, a retaining gate 660 can be lifted by, for example, accessor 18 or by a front storage cartridge 642 for cartridge removal from/insertion into a multi-cartridge deep slot cell 100. Specifically, retaining gate 660 has a pivoting arm 661 mounted on multi-cartridge deep slot cell 100 via a pivoting post (not shown) that can be integral to a construction of multi-cartridge deep slot cell 100. Pivoting arm 661 is located below a catch 662 of retaining gate 660 whereby a thrust force TF through data storage cartridge 644-642 caused by the pushing mechanism (not shown) of multi-cartridge deep slot cell 100 causes retaining gate 660 to stay closed in a retaining position as shown in FIG. 8A. Moreover, the retaining gate 660 is preferably biased such that it closes in the downward direction over the front opening of multi-cartridge deep slot cell 100. This constant biasing may be achieved via gravity as shown in FIG. 8A or by implementing a spring force, e.g., attached to retaining gate 660 (not shown).

For removal of front storage cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the thrust force TF of the pushing mechanism (not shown). During extraction of front storage cartridge 642 through the front opening of multi-cartridge deep slot cell 100, the retaining gate 660, which is being biased downward, moves back to the retaining position to engage storage cartridge 643.

Figure 8B:
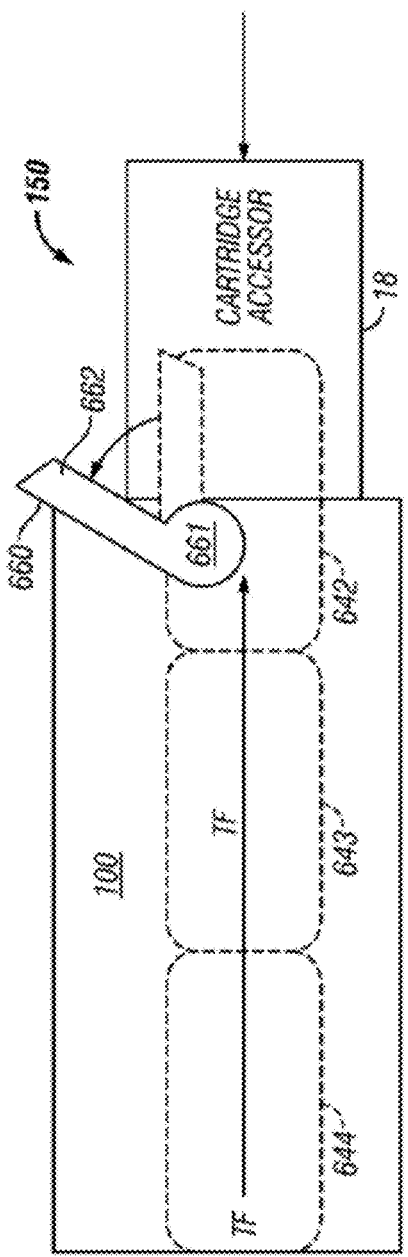

Once front storage cartridge 642 is extracted and storage cartridges 643 and 644 are retained from being pushed out of multi-cartridge deep slot cell 100, retaining gate 660 has successfully completed its cartridge retrieval process. Now retaining gate 660 demonstrates its ability to work for cartridge insertion into multi-cartridge deep slot cell 100. When accessor 18 begins to insert storage cartridge 642 back into multi-cartridge deep slot cell 100, retaining gate 660 is lifted to its releasing position to allow storage cartridge 642 through the front opening of multi-cartridge deep slot cell 100. Catch 662 of retaining gate 660 interfaces with a rear portion of storage cartridge 642, in particular a beveled surface of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing so, storage cartridges 644, 643 are pushed deeper into multi-cartridge deep slot cell 100 by storage cartridge 642 in multi-cartridge deep slot cell 100 by accessor 18. Thus, the accessor is able to provide a force greater than the thrust force TF antiparallel thereto, to overcome the directional biasing of the storage cartridges 644, 643. Upon full insertion into multi-cartridge deep slot cell 100, retaining gate 660 moves to its retaining position to engage storage cartridge 642 as shown in FIG. 8A.

Thus, looking to various embodiments presented herein, access to a storage slot may include the ability to remove a cartridge from a storage slot, the ability to place a cartridge into a storage slot, or combinations thereof.

According to an exemplary embodiment, the storage slots from top to bottom are considered to be in parallel and comprise the same tier. Moreover, the storage slots from front to back, in a particular row, are considered to be in series and comprise sequential tiers.

Referring back to FIGS. 7A-7B, in accordance with one embodiment, storage slots 120 are depicted as being configured for storing up to a plurality of data storage cartridges 600, and arranged in sequential order of tiers 621, 622, 623, 624, 625 from front to rear. It should be noted that the front-most tier 621 is also called "tier 1", while the next tier 622 is called "tier 2", etc., and the last tier 625 is also called the "rearmost" tier. However, referring to FIG. 2, in one embodiment, the single cartridge storage slots 16 are also termed "tier 0".

Referring again to FIGS. 1-3, according to one embodiment, the controller of automated data storage library 10 may operate the accessor(s) 18, 28 to selectively extract, place and/or transport data storage cartridges with respect to the multi-cartridge deep slot storage cells 100 and/or other elements of the automated data storage library 10. For example, the controller may facilitate extracting a cartridge from a multi-cartridge deep slot cell 100, transporting the cartridge to a data storage drive 15 and placing the cartridge in the drive 15. The controller may then extract the cartridge from the data storage drive 15, while directing the accessor to transport the cartridge to a specific multi-cartridge deep slot cell 100, and place the cartridge therein.

In one embodiment, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Figure 9:
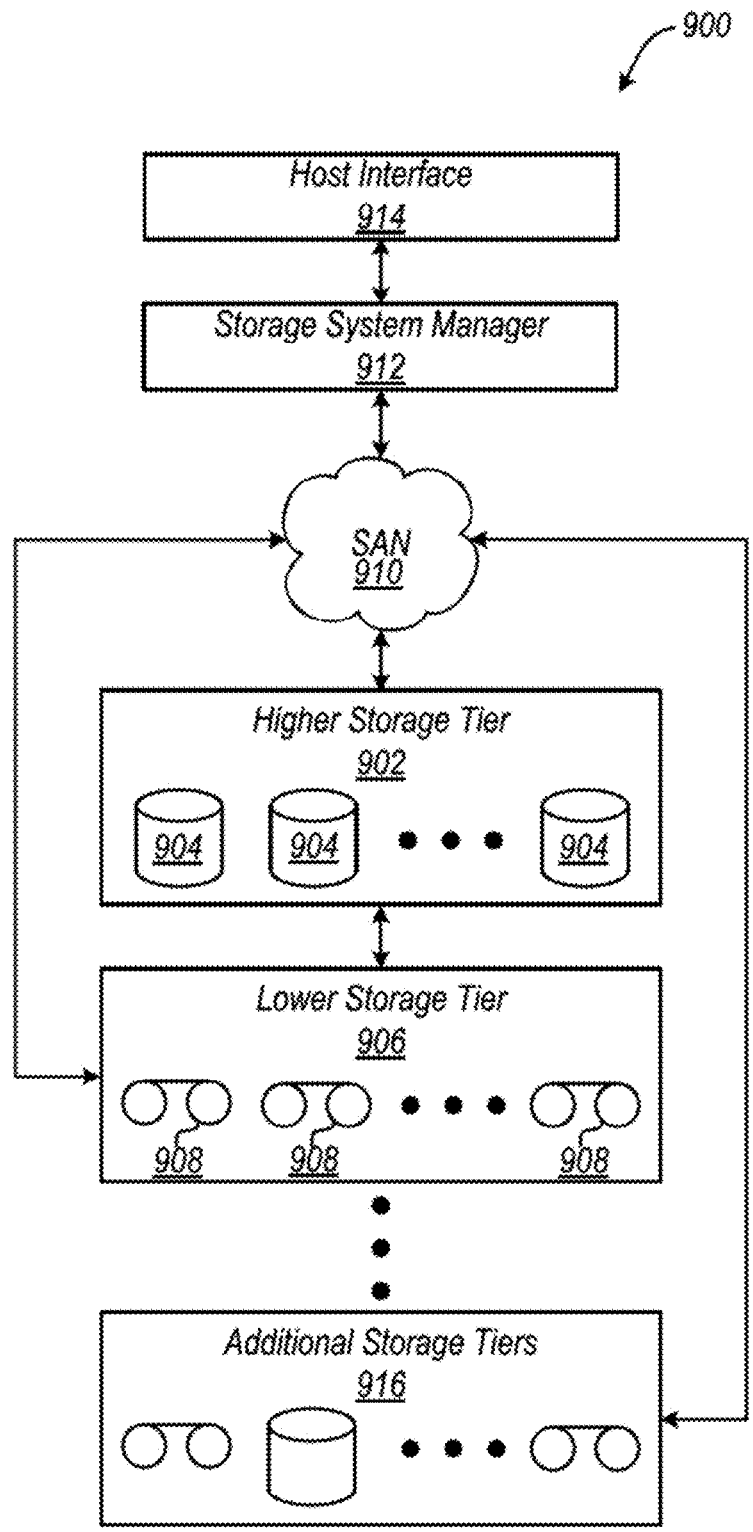
FIG. 9 is a tiered data storage system, in accordance with one embodiment.

Now referring to FIG. 9, a storage system 900 is shown according to one embodiment. Note that some of the elements shown in FIG. 9 may be implemented as hardware and/or software, according to various embodiments. In some approaches, the storage system 900 may be implemented in an automated data storage library such as that shown in FIGS. 1-2. In other approaches, an automated data storage library such as that shown in FIGS. 1-2 may be a tier of the storage system 900.

The storage system 900 may include a storage system manager 912 for communicating with a plurality of media on at least one higher storage tier 902 and at least one lower storage tier 906. The higher storage tier(s) 902 preferably may include one or more random access and/or direct access media 904, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 906 may preferably include one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Also, any of the higher storage tiers 902 and/or the lower storage tiers 906 may include some combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 900 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions. Of course, this logic may be implemented as a method on any device and/or system or as a computer program product, according to various embodiments.

Figure 10:
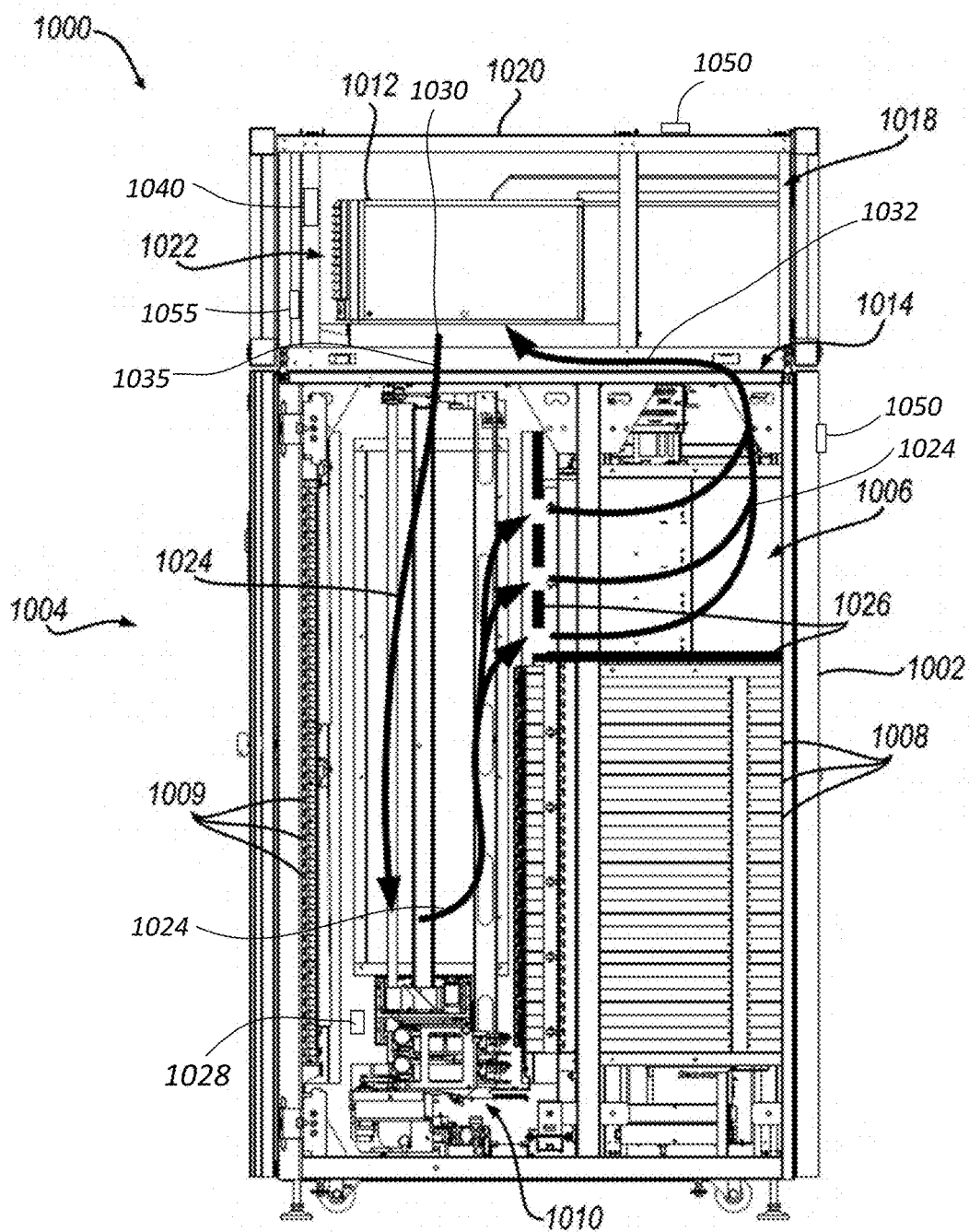
FIG. 10 is a partial side view of one embodiment of a system for storing magnetic recording media.

Referring now to FIG. 10, a system 1000 includes a frame 1002 of an automated data storage library 1004. As described above, automated data storage libraries are typically used to store tape cartridges and tape drives in large arrays to store large amounts of data. Thus, an interior of frame 1002 is illustrated in the present embodiment as including one or more tape drives 1006, an area for storing tape cartridges (e.g., multi-cartridge deep slot storage cells 1008 and single cartridge storage slots 1009), and a robotic accessor 1010, among other components which would be apparent to one skilled in the art upon reading the present description (e.g., see FIG. 2 above).

Automated data storage libraries have traditionally operated in environments having ideal temperature and humidity levels within the operational specifications of the tape media and tape drives. As such, automated data storage libraries have previously relied on outside air to flow through the library to keep the tape drives and tape media cool as the tape drives heat the air during the process of normal operation (e.g., such as reading and writing data to tape media). However, as mentioned above, this limits the number of environments an automated data storage library can be implemented in. If the air outside the library is not cool or dry enough, exposing the interior of the library thereto may be harmful to the tape media and/or the tape drives.

In contrast, system 1000 of FIG. 10 further includes an integrated air conditioning unit 1012 coupled to the frame 1002. The air conditioning unit 1012 may be coupled to an upper surface 1014 (e.g., the roof) of the frame 1002 as shown. This allows for the air conditioning unit 1012 to operate without negatively affecting the operating conditions in the frame 1002. However, an air conditioning unit may be functionally coupled the frame 1002 by positioning the air conditioning unit elsewhere and using ducts to route the air to the interior of the frame 1002, coupling the air conditioning unit to a side of the frame 1002, coupling the air conditioning unit to a bottom of the frame 1002 (underneath the frame 1002), etc., depending on the desired approach.

The air conditioning unit 1012 is preferably configured such that it may regulate the relative conditions (e.g., temperature, humidity, contaminant presence via filtering, etc.) inside the frame 1002. Thus, according to different approaches, the air conditioning unit may be able to reduce an ambient temperature of the interior of the frame 1002 and/or reduce the relative humidity of the interior of the frame 1002, depending on the type of air conditioning unit 1012. The air conditioning unit 1012 is preferably configured to turn on and off as desired to maintain a selected temperature in the interior of the frame 1002. Alternatively, the air conditioner fan can be left always on to keep air circulating within the interior of the frame, and the condenser turns on and off to maintain a selected temperature in the interior of the frame 1002.

As would be appreciated by one skilled in the art, the air conditioning unit 1012 may be able to adjust the relative temperature and/or humidity of the interior of the frame 1002 in a conventional manner. Cold air may flow into the interior of the frame 1002 via an inlet air duct which may connect the air conditioning unit 1012 to the interior of the frame 1002, thereby forming an inlet in the upper surface of the frame 1002. Specifically, an inlet air duct may direct the air cooled by the air conditioning unit 1012 into the interior of the frame 1002, e.g., where the majority of the tape media may be stored. As a result, air flow is created from the air conditioning unit 1012 to the interior of the frame 1002, as indicated by arrows 1024. This air flow may be induced by a fan included in the air conditioning unit 1012 and/or by using the fans in the one or more tape drives 1006, as will be described in further detail below.

Once in the interior of the frame 1002, the air flow may extend past the multi-cartridge deep slot storage cells 1008 and single cartridge storage slots 1009, eventually being carried past and/or through the one or more tape drives 1006. Thus, the air being cycled through the air conditioning unit transfers heat from interior of the frame 1002 and the tape drives 1006. A baffle or baffles 1026 are preferably configured to isolate hot air produced by (e.g., exiting) the tape drives 1006 from the area for storing tape cartridges. In other words, a baffle or baffles 1026 are preferably configured to create hot and cold air separation in the interior of the frame 1002. As mentioned above, magnetic tape and other magnetic media degrade when exposed to undesirable (e.g., hot, humid, etc.) conditions. Thus, it is preferred to prevent the heat produced by the tape drives 1006 from returning to the area for storing tape cartridges.

The air flow is preferably directed through the gaps in the vertical baffle, thereby causing the conditioned air to flow through each of the tape drives 1006. The gaps in the vertical baffle may also be used by the robotic accessor 1010 to provide tape cartridges to the tape drives 1006. Moreover, the horizontal baffle is preferably used to prevent air from flowing to the multi-cartridge deep slot storage cells 1008 once passed through the tape drives 1006. The air exiting the tape drives is hot (e.g., at least hotter than when it left the air conditioning unit 1012), and would otherwise thereby cause magnetic tape exposed thereto to be negatively affected. Thus, air exiting the tape drives 1006 is preferably directed back to the air conditioning unit 1012 to be conditioned (cooled, dehumidified, filtered, etc.) for further use as would be appreciated by one skilled in the art upon reading the present description. Although the air flow is preferably directed from the air conditioning unit 1012 to the interior of the frame 1002, and from the interior of the frame 1002 back to the air conditioning unit 1012, the particular path that the air flow is shown as extending along in the present embodiment by arrows 1024 is in no way intended to limit the invention.

With continued reference to FIG. 10, system 1000 may include an enclosure 1020 for the air conditioning unit 1012. An additional fan may be included in the enclosure 1020 for passing ambient air over external components of the air conditioning unit 1012 to further promote cooling. Moreover, the enclosure 1020 may include an opening, a baffle or baffles, etc. to direct ambient air toward an inlet 1022 of the air conditioning unit 1012.

Any vents, voids, seams, etc. in the frame 1002 of the library 1004, other than an inlet and an outlet in an upper surface of the frame 1002, are preferably sealed such that air from outside the frame 1002 cannot reach the interior thereof. This may effectively seal the frame 1002 of the automated data storage library 1004 such that the air flow circulating through the air conditioning unit 1012 is the only air moving into and out of the interior of the frame 1002. As a result, tape drives 1006, magnetic tape stored in the library 1004, etc., or other components in the frame 1002 may be isolated from the external environment and any unfavorable conditions which may be associated therewith. The frame 1002 may be sealed using any processes which would be apparent to one skilled in the art upon reading the present description, e.g., including but not limited to inserting foam, implementing insulating seals, etc. New frames may be built without any vents, voids, seams, etc.

System 1000 illustrated in FIG. 10 may further comprise one or more environmental sensors 1028 disposed therein. The environmental sensor(s) may be any appropriate sensor for determining the environmental conditions within the frame 1002, such as one or more temperature sensors, one or more humidity sensors, one or more pressure sensors, etc. The one or more environmental sensors 1028 may be in communication with a library controller, such as controller 400 shown and described with respect to FIG. 4. As such, the signal provided by the one or more environmental sensors 1028 may be utilized to control the output of the air conditioning unit 1012.

Although the embodiment illustrated in FIG. 10 includes a single frame 1002 and a single air conditioning unit 1012, other embodiments may include additional frames and/or air conditioning units.

While a data storage library having an associated and/or integrated environmental conditioning unit advantageously controls the environmental conditions within the library, some challenges may exist when components within such a data storage library need to be serviced or replaced. As noted above, many data centers are now maintained at higher temperatures and higher humidity levels to reduce the costs relating to cooling the data center. For this reason, environmental conditions exterior to the data storage library, e.g., in the data center, may be substantially different from those within a data storage library having an associated and/or integrated environmental conditioning unit. As such, a component (such as, for example, a data storage cartridge) that is moved abruptly from the warm, humid environment of the data center to the cool, dry environment of the data storage library may develop condensation and/or moisture on surfaces thereof. Moisture build-up on surfaces of sensitive components such as data storage cartridges and drives for reading data storage media is undesirable, as moisture may lead to adverse effects, and in extreme situations failure of the components and/or data loss.

Thus, in accordance with aspects of the present disclosure, one or more acclimation chambers may be associated with and/or incorporated into the data storage libraries (or portions of a data storage library) for moving components (e.g., data storage cartridges) between the libraries where the components are moved from a first environment (e.g., a hot and humid data storage library) into a second environment (e.g., a cool and dry data storage library), so that the components may gradually acclimate and can be moved in and out of an operational, environmentally-controlled library while inhibiting, resisting, and/or avoiding thermal shock, and/or the formation and/or accumulation of condensation on the transferred components. Similarly, the one or more acclimation chambers may also gradually acclimate the components to be moved from the second environment (e.g., a cool and dry data storage library) into the first environment (e.g., a hot and humid data storage library) in a manner to inhibit, resist, and/or avoid thermal shock, and/or the formation and/or accumulation of condensation on the transferred components.

In one aspect of the present disclosure, the one or more acclimation chambers may be formed as one or more acclimation library frames separate from one of more operational data storage library frames. The acclimation chamber(s) (e.g., acclimation libraries) may be coupled to the operational library frame(s) via a pass-through enclosure such that data storage cartridges may be automatically passed from the one or more acclimation chambers to the one or more operational data storage library frames (and vice versa).

Figure 11:
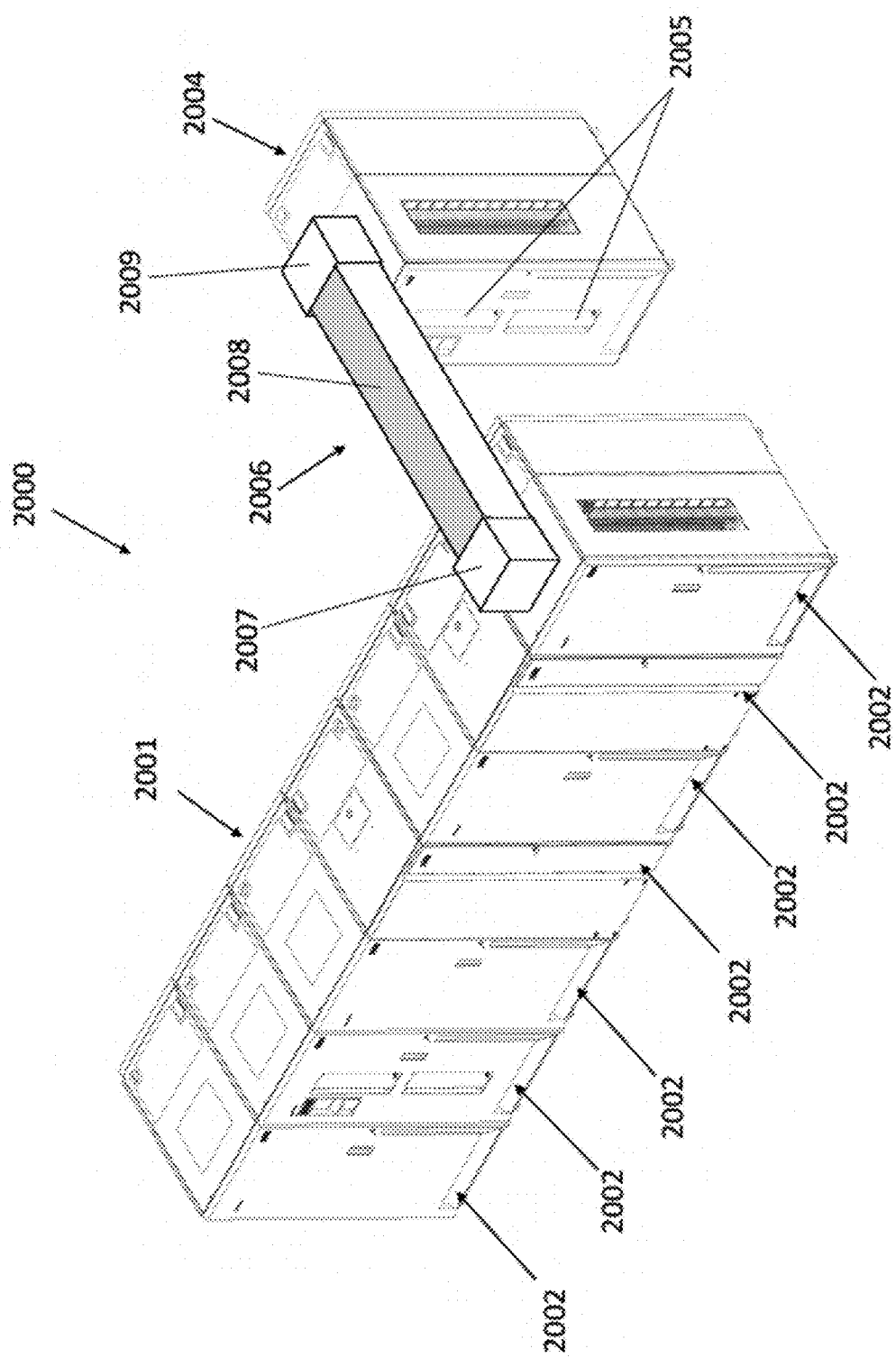
FIG. 11 is a perspective view of one embodiment of an automated data storage library.

Referring to FIG. 11, a data storage library system 2000 in accordance with an aspect of the present disclosure is illustrated. Data storage library system 2000 is shown as comprising a seven-frame primary data storage library 2001 having a plurality of primary library frames 2002. However, it is to be understood that more or fewer primary library frames 2002 may be present in data storage library 2000. Primary library frames 2002 may comprise conventional data storage library componentry, similar to that which is described with respect to library 10 illustrated in FIG. 2. For instance, one or more of library frames 2002 may comprise a plurality of storage slots to hold data storage cartridges, data storage cartridges, one or more drives for reading and/or writing data associated with the data storage cartridges, controllers, communication cards, and one or more robotic accessors. Furthermore, while not shown, primary data storage library 2001 may be associated with, equipped with, include, and/or incorporate one or more environmental conditioning units, such as that described above with respect to data storage library 1004 in FIGS. 1B and 10. In the present embodiment, an environmental conditioning unit refers to any device capable of conditioning and/or modifying the ambient air, and may comprise a device or devices capable of cooling, heating, removing humidity, adding humidity, ionization, etc. The type and function of the environmental conditioning unit may be dependent upon the location and/or facility in which the data storage library 2000 is utilized. For instance, the ambient air in one data center installation may be warm and humid, while the ambient air of another data center installation may be cold and dry. In the first instance, an environmental conditioning unit which conventionally cools and removes humidity from the air (e.g., an air conditioning unit) within the data storage library would be desirable, while in the second instance, an environmental conditioning unit which warms and adds humidity to the air within the data storage library would be desirable.

In addition to the primary data storage library 2001, data storage library system 2000 may further include an acclimation library 2004 which is independent from primary data storage library 2001. Acclimation library 2004 may comprise a single frame or it may comprise multiple frames. In addition, acclimation library 2004 may comprise conventional data storage library componentry, as described above with respect to primary data storage library 2001, or it may only comprise an accessor for moving cartridges and one or more locations for holding cartridges while the acclimation process is taking place (e.g., single deep storage slots, multi-cartridge deep storage slots, I/O slots, gripper slots, etc.). Acclimation library 2004 and primary data storage library 2001 are coupled to one another via a pass-through enclosure 2006. Pass-through enclosure 2006 is configured as a housing and passageway to enable data storage cartridges from within the acclimation library 2004 to be physically transported to the primary data storage library 2001, and vice versa, in an environment insulated, separate, and/or isolated from the conditions external to the library 2001 (e.g., the environmental conditions of the data center). Specifically, a vertical span 2009 of pass-through enclosure 2006 may be configured to enable data storage cartridges within the acclimation library 2004 to be delivered to a horizontal span 2008. The data storage cartridges may then be transported along a track or other conveying mechanism within horizontal span 2008 to another vertical span 2007, which allows the data storage cartridges to be delivered to the primary data storage library 2001. It is to be understood that any suitable means of lifting and/or conveying the data storage cartridges within pass-through enclosure 2006 (e.g., track-driven cars, accessors, conveyor belts, etc.) is possible and within the scope of the disclosure. For example, a vertical accessor may move vertically within primary library frame 2002 and within or up to the opening in the library frame associated with vertical span 2007. A vertical accessor may move vertically within acclimation library 2004 and within and/or up to the opening in the acclimation library frame 2004 and the vertical span 2009. A horizontal accessor may move horizontally between and/or within and through the openings in the vertical spans 2007, 2009. In addition, this horizontal accessor may have a mechanism that allows it to extend or reach into vertical spans 2007, 2009 and thereby eliminating the need for an independent vertical accessor. It is to be understood that other pass-through mechanisms are possible and within the scope of the disclosure. For example, one side or surface of primary data storage library 2001 may be in contact with one side or surface of acclimation library 2004. In this example, the pass-through mechanism could be one or more rotating slots positioned along the contacting side or surface such that an accessor associated with primary data storage library 2001 places a cartridge in the rotating slot and the slot rotates so the cartridge is accessible to an accessor associated with acclimation library 2004. Herein, a pass-through mechanism may comprise any type of apparatus or device capable of moving a cartridge from one library to another library.

It is to be understood that each of primary data storage library 2001 and acclimation library 2004 may include one or more associated environmental conditioning units, such as those shown in FIGS. 1B and 10. In such an embodiment, the environmental conditions (e.g., temperature, humidity, etc.) within primary data storage library 2001 and acclimation library 2004 may be controlled separately. In other embodiments, only the primary data storage library 2001 may have an associated, dedicated environmental conditioning unit. In one embodiment, the environmental conditions within acclimation library 2004 are controlled so as to prepare the acclimation library 2004 for introduction of data storage cartridges from outside of the data storage library system 2000. Specifically, the environmental conditions within the acclimation library 2004 are ramped to a level substantially similar to (e.g., within a desired range of) the ambient environmental conditions outside of data storage library system 2000. This may be accomplished via the passive introduction of ambient air into the acclimation library or the active introduction of environmentally conditioned air from any appropriate environmental device. The environmental device for the acclimation library 2004 may include, for example, one or more environmental conditioning units, and additionally or alternatively, one or more environmental control devices such as, for example, one or more fans, electric heaters, thermo-electric heaters, thermo-electric coolers, liquid heaters, liquid coolers, air conditioners, heat pumps, evaporative coolers, ionizers, deionizers, humidifiers, dehumidifiers, or other environmental devices to adjust environmental conditions, and combinations thereof.

Once the environmental conditions within the acclimation library 2004 are determined to be substantially similar to the ambient environmental conditions, one or more data storage cartridges may be inserted into the acclimation library 2004. In one embodiment, the environmental conditioning unit(s) or other environmental control devices of the acclimation library 2004 may then operate to gradually ramp the environmental conditions within the acclimation library 2004 toward the environmental conditions within the primary data storage library 2001. A gradual increase (or decrease) in environmental conditions aids in inhibiting, resisting, and/or preventing undesirable effects (e.g., condensation formation and/or accumulation on the one or more data storage cartridges) due to an abrupt change in surrounding conditions. As the environmental conditions within the acclimation library 2004 become within a desired range of (e.g., within a (predetermined) threshold and/or is substantially similar to) the environmental conditions within the primary data storage library 2001, the acclimated data storage cartridges may be transported from the acclimation library 2004 into the primary data storage library 2001 via the pass-through enclosure 2006.

Similarly, when the data storage cartridges are to be removed from data storage library system 2000, acclimation library 2004 may operate so as to gradually acclimate data storage cartridges from the conditioned environment of the primary data storage library 2001 to the ambient environment outside of data storage library system 2000. That is, the environmental conditions within acclimation library 2004 may be prepared (or maintained) to be substantially similar to (e.g., at, near, and/or within a range or threshold of) the environmental conditions within primary data storage library 2001. When it is determined that the environmental conditions within acclimation library 2004 are suitable, the one or more data storage cartridges within the primary data storage library 2001 may be transported to the acclimation library 2004 via the pass-through enclosure 2006. The environmental conditions within the acclimation library 2004 may then be gradually ramped toward the ambient environmental conditions outside of data storage library system 2000. When the environmental conditions within the acclimation library 2004 are substantially similar to (e.g., at, near, and/or within a range of) the ambient environmental conditions, the acclimated data storage cartridges may be safely removed from the acclimation library 2004.

Referring still to FIG. 11, in accordance with another embodiment, acclimation library 2004 may comprise one or more input/output (I/O) stations 2005. I/O stations 2005 may comprise a door and one or more slots for the insertion (and/or removal) of data storage cartridges within the acclimation library 2004 without the need to access the interior of acclimation library 2004. Data storage cartridges placed within I/O stations 2005 may be retrieved by a robotic accessor (not shown) within acclimation library 2004 and moved to other storage slots for acclimation. Likewise, the robotic accessor may retrieve acclimated data storage cartridges within acclimation library 2004 and place them in one or more slots of the I/O stations 2005 for removal by an operator. In another embodiment, the data storage cartridges placed within I/O stations 2005 do not need to be moved to other storage slots, but may instead be acclimated directly in the slots of I/O stations 2005. In one embodiment, the primary data storage library 2001 may not incorporate one or more I/O stations, but may preferably utilize the pass-through enclosure 2006 to import or export data storage cartridges.

In accordance with another aspect of the present disclosure, pass-through enclosure 2006 may further comprise one or more environmental barriers disposed therein so as to inhibit, resist, and/or prevent the passage of environmental conditions between the primary data storage library 2001 and the acclimation library 2004. The environmental barrier(s) (not shown) may comprise one or more doors, hanging panels, sliding panels, hinged panels, flaps, curtains, hanging slats, split membrane, air curtains, or any other suitable device or method of inhibiting, resisting, and/or preventing environmental contamination between separate spaces. The one or more environmental barriers may be disposed within one or more of the vertical spans 2007, 2009, the horizontal span 2008, and/or the one or more openings in the primary data storage library 2001 and the acclimation library 2004, which permit transport of the data storage cartridges to the pass-through mechanism. Alternatively, environmental barriers may be located elsewhere in primary data storage library 2001 and/or acclimation library 2004.

Figure 12:
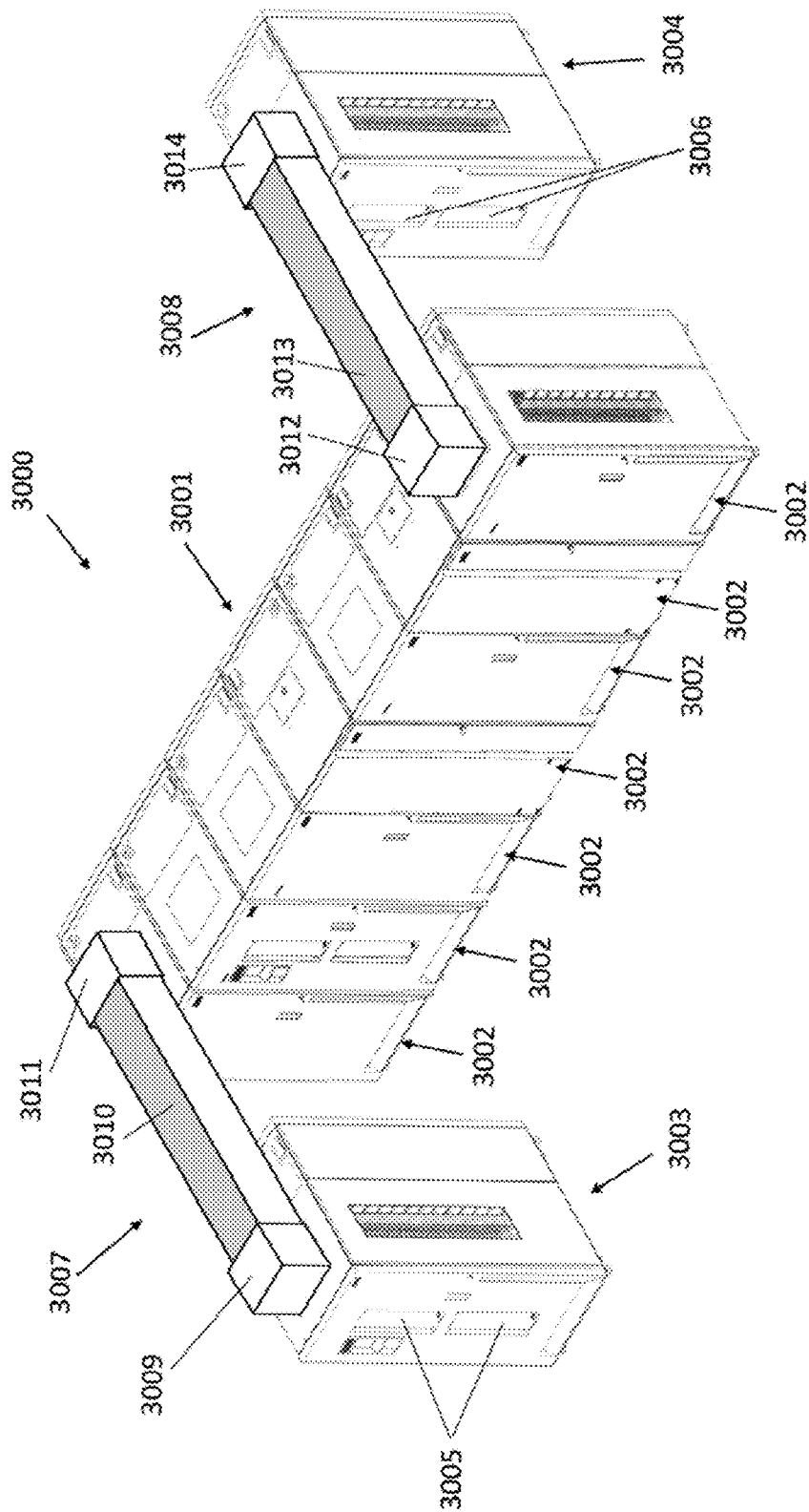
FIG. 12 is a perspective view of another embodiment of an automated data storage library.

Next, referring to FIG. 12, a data storage library system 3000 in accordance with another embodiment of the present disclosure is illustrated. Data storage library system 3000 comprises a primary data storage library 3001 having a plurality of primary library frames 3002. However, it is to be understood that more or fewer primary library frames 3002 may be present in data storage library system 3000. Library frames 3002 may comprise conventional data storage library componentry, similar to that which is described with respect to library 10, illustrated in FIG. 2. For instance, one or more of library frames 3002 may comprise a plurality of storage slots to hold data storage cartridges, data storage cartridges, one or more tape drives, controllers, communication cards, and one or more accessors. Furthermore, while not shown, primary data storage library 3001 optionally may be associated and/or equipped with one or more environmental conditioning units, such as that which is described above with respect to data storage library 1004 in FIGS. 1B and 10. In the present embodiment, an environmental conditioning unit refers to any device capable of conditioning and/or modifying the ambient air, and may comprise a device or devices capable of cooling, heating, removing humidity, adding humidity, removing or adding ionization, etc.

Data storage library system 3000 also may comprise a pair of acclimation libraries 3003, 3004, wherein acclimation library 3003 is coupled to primary data storage library 3002 via a pass-through enclosure 3007, and acclimation library 3004 is coupled to primary data storage library 3002 via a pass through enclosure 3008. Alternatively, a single pass-through enclosure may couple both acclimation libraries 3003, 3004 to the primary data storage library 3001. Acclimation libraries 3003, 3004 may comprise single frames or they may comprise multiple frames. In addition, acclimation libraries 3003, 3004 may comprise conventional data storage library componentry, as described above with respect to primary data storage library 3001, or they may only comprise an accessor for moving cartridges and one or more locations for holding cartridges while the acclimation process is taking place (e.g., single deep storage slots, multi-cartridge deep storage slots, I/O slots, gripper slots, etc.). Furthermore, it is to be understood that more acclimation libraries may also be incorporated into data storage library system 3000. Similar to data storage library 2000 described above with respect to FIG. 11, pass-through enclosures 3007, 3008 are configured to enable data storage cartridges from within the respective acclimation libraries 3003, 3004 to be physically transported to the primary data storage library 3001, and vice versa. Specifically, a vertical span 3009 is configured to enable data storage cartridges within the acclimation library 3003 to be delivered to a horizontal span 3010. The data storage cartridges may then be transported along a track or other conveying mechanism within horizontal span 3010 to another vertical span 3011, which allows the data storage cartridges to be delivered to the primary data storage library 3001. Data storage cartridges may also be delivered from the primary data storage library 3001 to the acclimation library 3003 in a similar fashion. Similarly, a vertical span 3014 in communication with acclimation library 3004 is configured to enable data storage cartridges within the acclimation library 3004 to be delivered to a horizontal span 3013. The data storage cartridges may then be transported along a track or other conveying mechanism within horizontal span 3013 to another vertical span 3012 in communication with the primary data storage library 3001, which allows the data storage cartridges to be delivered to the primary data storage library 3001, and/or vice versa. It is to be understood that any suitable means of lifting and/or conveying the data storage cartridges within pass-through enclosures 3007, 3008 (e.g., track-driven cars, robotic accessors, conveyor belts, etc.) is possible and within the scope of the disclosure. It is to be understood that other pass-through mechanisms are possible and within the scope of the disclosure. For example, one side or surface of primary data storage library 3001 may be in contact with one side or surface of acclimation library 3004. In this example, the pass-through mechanism could be one or more rotating slots positioned along the contacting side or surface such that an accessor associated with primary data storage library 3001 places a cartridge in the rotating slot and the slot rotates so the cartridge is accessible to an accessor associated with acclimation library 3004.

In one aspect of the present disclosure, primary data storage library 3001 is configured to be the operational data storage library for reading/writing of data to data storage cartridges, while acclimation libraries 3003, 3004 act as acclimation chambers for gradually ramping the environmental conditions to which the data storage cartridges are exposed toward one of the internal environmental conditions of the primary data storage library or the ambient environmental conditions external to the data storage library system 3000 (including acclimation libraries 3003, 3004), sometimes referred to as ambient external environmental conditions. In a situation where acclimation library 3003 is still ramping toward ambient external environmental conditions, while acclimation library 3004 is already maintained at ambient external conditions, data storage cartridge(s) may be introduced into acclimation library 3004 first to allow the acclimation process to begin. As acclimation library 3004 is in the process of gradually ramping from one environmental condition to another, it is not desirable to introduce more data storage cartridges therein. However, acclimation library 3003 may have completed its gradual change in environmental conditions toward ambient, thereby enabling data storage cartridge(s) to instead be introduced into acclimation library 3003. In this way, data storage cartridges may be moved into or out of acclimation libraries 3003, 3004 in a more efficient manner, with less time being spent waiting for an acclimation process to begin or end in one particular acclimation library.

In accordance with an alternative aspect of the present disclosure, acclimation library 3003 may be normally maintained to have ambient external environmental conditions, while acclimation library 3004 may be normally maintained to have conditioned environmental conditions similar to those found within primary data storage library 3001. In this way, acclimation library 3003 may generally be relied upon for the import of data storage cartridges into data storage library 3000, while acclimation library 3004 may generally be relied upon for the export of data storage cartridges out of data storage library 3000. After data storage cartridges are introduced into acclimation library 3003, the environmental conditions within the acclimation library are gradually ramped toward the environmental conditions within primary data storage library 3001. When the differential in environmental conditions between the acclimation library 3003 and primary data storage library 3001 is at, near, and/or is within or reaches a desired range and/or threshold (which may be predetermined), the data storage cartridges may be moved from acclimation library 3003 to the primary data storage library 3001 via the pass-through enclosure 3007. Then, once the data storage cartridges have been transferred to the primary data storage library 3001, the environmental conditions within acclimation library 3003 are again ramped toward ambient external environmental conditions.

Next, when data storage cartridges are to be exported from primary data storage library 3001, they are transported to acclimation library 3004 via pass-through enclosure 3008, where acclimation library 3004 is already maintained to have environmental conditions at, near, similar to, and/or within a range or threshold of those environmental conditions within primary data storage library 3001. Acclimation library 3004 then gradually ramps the environmental conditions within acclimation library 3004 toward the ambient external environmental conditions so as to allow for export/removal of the data storage cartridges preferably without undesirable effects (e.g., the formation and/or accumulation of condensation). After removal of the data storage cartridges, the acclimation library 3004 may return to an environmental state at, near, similar to, and/or within a desired range or threshold of the primary data storage library 3001. In this way, one acclimation library (e.g., acclimation library 3003) is generally dedicated to the import of data storage cartridges, while the other acclimation library (e.g., acclimation library 3004) is generally dedicated to the export of data storage cartridges.

In accordance with another alternative aspect of the present disclosure, acclimation libraries 3003, 3004 may alternate between being an import-dedicated acclimation library and an export-dedicated library. For example, in a first process, acclimation library 3003 may be maintained at or near ambient external environmental conditions so as to allow for the importation of one or more data storage cartridges. After one or more cartridges have been inserted into acclimation library 3003 (e.g., by an operator), acclimation library 3003 then gradually ramps the internal environmental conditions towards those of the primary data storage library 3001 until it is suitable to transport the data storage cartridges from acclimation library 3003 to primary data storage library 3001 via the pass-through enclosure 3007. However, unlike the embodiment described above, the environmental conditions within acclimation library 3003 are maintained at, near, similar to, and/or within a desired range or threshold of the environmental conditions within primary data storage library 3001. Once data storage cartridges within primary data storage library 3001 are prepared for export, the data storage cartridges are sent, via pass-through enclosure 3008, to acclimation library 3004, which is initially maintained at, near, similar to, and/or within a desired range or threshold of the environmental conditions of primary data storage library 3001. The acclimation library 3004 then gradually ramps its internal conditions towards the ambient external environmental conditions such that the data storage cartridges may be safely exported therefrom. Acclimation library 3004 is then maintained at the ambient external environmental conditions. As such, the subsequent importation of data storage cartridges occurs within acclimation library 3004, while exportation of data storage cartridges occurs from acclimation library 3003. In this way, acclimation libraries 3003, 3004 alternate between being an import station and an export station such that the acclimation libraries 3003, 3004 do not necessarily need to continually change their internal environmental conditions between import/export cycles. Alternatively, before, during or after the acclimation process of acclimation library 3003 from an external environment to an internal environment, acclimation library 3004 may perform an acclimation process from an internal environment to an external environment. This may be advantageous for reducing the time required if back-to-back import or export operations are required.

Referring still to FIG. 12, in accordance with another embodiment, acclimation libraries 3003, 3004 may comprise one or more input/output (I/O) stations 3005, 3006, respectively. I/O stations 3005, 3006 may comprise a door and one or more slots for the insertion (and/or removal) of data storage cartridges within the acclimation libraries 3003, 3004 without the need to access the interior of acclimation libraries 3003, 3004. Data storage cartridges placed within I/O stations 3005, 3006 may be retrieved by a robotic accessor (not shown) within each acclimation library 3005, 3006 and moved to other storage slots for acclimation. Likewise, the robotic accessor may retrieve acclimated data storage cartridges within acclimation libraries 3003, 3004 and place them in one or more slots of the I/O stations 3005, 3006 for removal by an operator. In another embodiment, the data storage cartridges placed within I/O stations 3005, 3006 do not need to be moved to other storage slots, but may instead be acclimated directly in the slots of I/O stations 3005, 3006.

In accordance with another aspect of the present disclosure, pass-through enclosures 3007, 3008 may each further comprise one or more environmental barriers disposed therein so as to inhibit, restrict, and/or prevent the passage of environmental conditions between the primary data storage library 3001 and the acclimation libraries 3003, 3004. The environmental barrier(s) (not shown) may comprise one or more doors, hanging panels, sliding panels, hinged panels, flaps, curtains, hanging slots, split membrane, air curtains, or any other suitable device or method of preventing environmental contamination between separate spaces. The one or more environmental barriers may be disposed within one or more of the vertical spans 3009, 3011, 3012, 3014, the horizontal spans 3010, 3013, and/or the openings between the vertical spans and the libraries (operation and/or acclimation libraries). Alternatively, the environmental barriers may be located elsewhere in primary data storage library 3001 and/or acclimation libraries 3003, 3004.

In one aspect of the present disclosure, the acclimation libraries described above may achieve environmental acclimation passively, i.e., through passive communication with the ambient external environment. For example, an external vent, portal, or opening between the acclimation library and its exterior may be provided with a door, baffle, and/or barrier selectively movable to permit ambient air from outside the data storage library to flow into, communicate, and/or mix with the acclimation library to bring the environmental conditions within the acclimation library to an ambient external state or as part of an acclimation process. Conversely, an internal vent, portal, or opening between the acclimation library and the interior of the primary data storage library may be provided with a door, baffle, and/or barrier selectively movable to permit conditioned air from inside the data storage library to flow into, communicate, and/or mix with the acclimation library to bring the environmental conditions within the acclimation library to a conditioned state or as part of an acclimation process. The door, baffle, damper, barrier, etc., may be opened manually (e.g. by the operator) or it may be opened automatically (e.g., by a data storage library controller, actuator, motor, accessor, etc.).

Alternatively, the acclimation libraries may achieve environmental acclimation through one or more fans. For example, a fan may move air from the ambient external environment (i.e., the environment outside the data storage library) into the acclimation libraries either to prepare the chamber for an ambient state or as part of an acclimation process. Conversely, a fan may move air from the conditioned environment (i.e., the environment inside the data storage library) into the acclimation libraries to either prepare the chamber for a conditioned state or as part of an acclimation process. One fan may be used to move ambient external air into the acclimation libraries and another fan may be used to move conditioned air into the acclimation libraries. Alternatively, a single fan could be used for both actions simply by changing the direction of the fan rotation. The fan(s) may be activated manually (e.g., by operator activation) or they may be activated automatically (e.g., by a data storage library controller). The fans may have a fixed air flow or they may have a variable airflow to allow the acclimation to be controlled by increasing or decreasing the air flow.

Still further, the acclimation libraries may achieve acclimation through the use of other environmental control devices, as described above. For example, there may be a thermoelectric heater associated with the acclimation library, with the thermoelectric heater acting as an environmental device to assist with acclimation library preparation and/or an acclimation process. Furthermore, the acclimation library may comprise multiple environmental control devices. For example, there may be one or more fans, electric heaters and air conditioners.

There may also be environmental sensors (e.g., temperature, humidity, etc.) in, around, and/or exterior of the acclimation libraries; in, around, and/or exterior of the primary data storage library; in, around, and/or exterior of any environmental conditioning units, in or around any environmental control devices; and/or in or around the source of any external components associated with the acclimation libraries. Such environmental sensors may allow environmental conditions to be monitored and/or controlled during a preparation of the acclimation libraries and/or an acclimation process. The monitoring and/or control may be performed by one or more controllers, and/or processors associated with the data storage library system, the acclimation library, the primary data storage library, a component associated with an environmental control device, a data storage library controller, or another control system.

Figure 13:
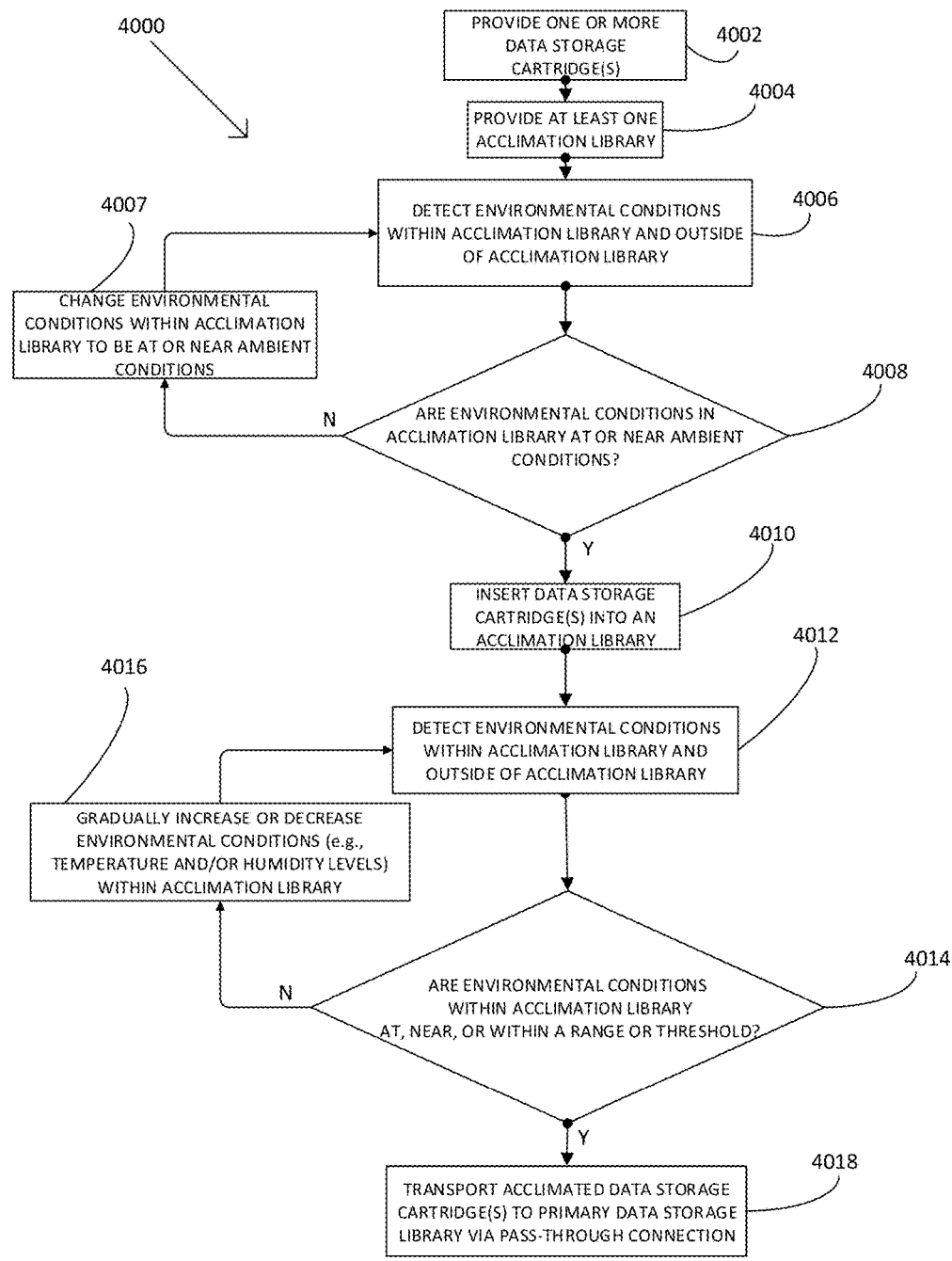
FIG. 13 is a flowchart of one embodiment of a method for acclimating at least one data storage cartridge in an automated data storage library.

Referring to FIG. 13, an initial acclimation process 4000, for example, for transporting data storage cartridges into an operational data storage library in accordance with one aspect of the present disclosure is illustrated. While acclimation process 4000 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 13. First, at 4002, one or more data storage cartridges are provided, with the one or more data storage cartridges being capable of storing data thereon. Next, at 4004, at least one acclimation library is provided, with the at least one acclimation library being capable of adjusting and/or changing its environmental conditions therein. At 4006, the environmental conditions (e.g., temperature and/or humidity) both within the acclimation library and outside of the acclimation library are detected. A determination is made if the desired environmental conditions within the acclimation library are at, near, and/or within a range or threshold (which may be predetermined in embodiments) of the ambient external environmental conditions at 4008. Such a determination may be made by one or more environmental sensors both within and external to the acclimation library. If the desired environmental conditions are not at, near, and/or within the desired range or threshold, environmental conditions within the acclimation library are changed toward desired ambient environmental conditions outside of the acclimation library at 4007. If the desired one or more environmental condition(s) within the acclimation library are suitable, one or more data storage cartridges are inserted into the acclimation library in accordance with any of the above-described methods at 4010.

At 4012, the desired one or more environmental conditions (e.g., temperature and/or humidity levels) within the acclimation library are detected, for example, with environmental sensors, and a determination is made if the desired environmental condition(s) within the acclimation library are at, near, and/or within a range or threshold of the corresponding environmental condition(s) within or exterior of the data storage library (e.g., the operational library) at 4014. At 4016, if the desired one or more environmental condition(s) (e.g., temperature and/or humidity levels) within the acclimation library have not met the range or threshold as compared to the levels in the interior or exterior of the data storage library, the process continues to gradually increase or decrease the desired one or more environmental conditions (e.g., temperature and/or humidity levels). However, if the desired one or more environmental condition(s) (e.g., temperature and/or humidity levels) within the acclimation library have met the range or threshold, the acclimation process is complete and the acclimated data storage cartridge(s) may be transported to a primary data storage library via a pass-through enclosure at 4018.

As an alternative to the process described above with respect to FIG. 13, the determination of acclimation may be made via passage of a predetermined time period. For example, instead of determining the desired one or more environmental conditions (e.g., the temperature and/or humidity levels) within an acclimation library via one or more environmental sensors, the library controller/processor may calculate the passage of time from when the data storage cartridge(s) first were inserted into the acclimation library. If a predetermined amount of time has passed that is known or calculated/looked-up (e.g., based upon internal and/or external library conditions) to provide sufficient acclimation, the acclimated data storage cartridge(s) may pass to the primary data storage library via the pass-through enclosure. The predetermined amount of time may be stored in, e.g., a look-up table accessible by the library controller/processor, and may depend upon known conditions within the data storage library, the acclimation library, and/or the data center.

It follows that various embodiments described and/or suggested herein are able to provide data storage systems, more specifically, automated data storage libraries having climate control capabilities associated and/or integrated with the automated data storage library, with at least one dedicated acclimation library. As a result, favorable environmental conditions (e.g., temperature, humidity, presence of contaminants, etc.) may be maintained for the data storage drives and/or media which may be stored in the library frames, while undesirable effects (e.g., the formation and/or accumulation of condensation and/or moisture on the media (and its subsequent effect on contacting devices)) may be inhibited, resisted, and/or avoided.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as controller 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A data storage library, the system comprising:
 a first data storage library and a second data storage library, wherein the first data storage library has a first environmental conditioning unit configured to control at least one environmental condition within the first data storage library; and
 at least one pass-through mechanism coupling the first data storage library to the second data storage library, wherein the at least one pass-through mechanism is configured to enable data storage cartridges to be transported between the first data storage library and the second data storage library,
 wherein the environmental conditions within the first data storage library are controllable to maintain operational conditions conducive to at least one of reading and writing of data on a plurality of data storage cartridges,
 wherein the environmental conditions within the second data storage library are controllable so as to gradually transition the environmental conditions within the second data storage library between ambient environmental conditions outside of the first data storage library and operational conditions within the first data storage library, and
 wherein data storage cartridges within the second data storage library are prevented from passing to the first data storage library via the at least one pass-through mechanism until the environmental conditions within the second data storage library have transitioned to a predetermined level similar to the operational conditions within the first data storage library.

2. The data storage library system of claim 1, wherein at least one of the first data storage library, the second data storage library, and the first and second data storage library both consist of at least one of a thermoelectric heater, a thermoelectric cooler, an electric heater, a liquid heater, a liquid cooler, an air conditioner, a heat pump, an evaporative cooler, an ionizer, a deionizer, a humidifier, a dehumidifier, one or more fans, and any combination thereof.

3. The data storage library system of claim 1, wherein the second data storage library further comprises at least one I/O station configured for at least one of an import and export of tape cartridges.

4. The data storage library system of claim 1, further comprising a third data storage library, wherein the third data storage library is coupled to the first data storage library via a pass-through mechanism.

5. The data storage library system of claim 4, wherein the environmental conditions within the third data storage library are controllable so as to gradually transition the environmental conditions within the third data storage library from ambient environmental conditions outside of the third data storage library toward the operational conditions within the first data storage library.

6. The data storage library system of claim 4, wherein the third data storage library consists of at least one of a thermoelectric heater, a thermoelectric cooler, an electric heater, a liquid heater, a liquid cooler, an air conditioner, a heat pump, an evaporative cooler, an ionizer, a deionizer, a humidifier, a dehumidifier, one or more fans, and any combination thereof.

7. The data storage library system of claim 4, wherein the third data storage library further comprises at least one I/O station configured for at least one of an import and export of data storage cartridges.

8. The data storage library system of claim 1, wherein the at least one pass-through mechanism comprises at least one environmental barrier therein.

9. The data storage library system of claim 8, wherein the at least one environmental barrier comprises one or more of a door, hanging panel, sliding panel, hinged panel, flaps, curtains, hanging slots, split membrane, and air curtains.

10. The data storage library system of claim 1, wherein the system further comprises at least one sensor configured for measuring at least one environmental condition within at least one of the first data storage library, the second data storage library, and external of the data storage library system.

11. A data storage library, the system comprising:
a first data storage library and a second data storage library, wherein the first data storage library has a first environmental conditioning unit configured to control at least one environmental condition within the first data storage library; and
at least one pass-through mechanism coupling the first data storage library to the second data storage library, wherein the at least one pass-through mechanism is configured to enable data storage cartridges to be transported between the first data storage library and the second data storage library,
wherein the environmental conditions within the first data storage library are controllable to maintain operational conditions conducive to at least one of reading and writing of data on a plurality of data storage cartridges,
wherein the environmental conditions within the second data storage library are controllable so as to gradually transition the environmental conditions within the second data storage library between ambient environmental conditions outside of the first data storage library and operational conditions within the first data storage library, and
wherein the at least one pass-through mechanism comprises a first vertical span coupled to the second data storage library, a second vertical span coupled to the first data storage library, and a horizontal span coupling the first vertical span and the second vertical span,
wherein the second data storage library is an acclimation library that is not operational for at least one of reading and writing data to data storage media, and
wherein the second data storage library has at least one of an environmental conditioning unit and an environmental control device associated therewith.

12. A method of acclimating one or more data storage cartridges, the method comprising:
providing a data storage library system having at least one primary data storage library and at least one acclimation library, wherein the at least one acclimation library is coupled to the at least one primary data storage library with a pass-through mechanism;
providing at least one data storage cartridge;
adjusting at least one environmental condition within the at least one acclimation library to within a desired range of the at least one ambient environmental condition outside of the at least one acclimation library;
inserting the at least one data storage cartridge into the at least one acclimation library;
adjusting at least one environmental condition within the at least one acclimation library based upon monitored environmental conditions within the at least one acclimation library and environmental conditions within the at least one primary data storage library; and
transporting the at least one data storage cartridge from the at least one acclimation library to the at least one primary data storage library via the pass-through mechanism when the at least one environmental condition within the at least one acclimation library is within a desired range of the corresponding environmental condition within the primary data storage library.

13. The method of claim 12, wherein the at least one environmental condition monitored within the at least one acclimation library and outside of the at least one acclimation library is at least one of temperature and humidity.

14. The method of claim 12, further comprising inserting the at least one data storage cartridge into an I/O station within the at least one acclimation library.

15. The method of claim 12, further comprising transporting one of the at least one data storage cartridge from the at least one primary data storage library to the at least one acclimation library via the pass-through mechanism when it is determined that the at least one data storage cartridge is prepared for export from the primary data storage library.

* * * * *